United States Patent
Yamashita et al.

(10) Patent No.: US 10,262,038 B2
(45) Date of Patent: Apr. 16, 2019

(54) ANSWERER EXTRACTION SYSTEM, ANSWERER EXTRACTION METHOD, AND NON-TRANSITORY COMPUTER-READABLE MEDIUM

(71) Applicant: FUJI XEROX CO., LTD., Tokyo (JP)

(72) Inventors: Akio Yamashita, Kanagawa (JP); Yoshihiro Ueda, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 485 days.

(21) Appl. No.: 14/534,322

(22) Filed: Nov. 6, 2014

(65) Prior Publication Data

US 2015/0356146 A1   Dec. 10, 2015

(30) Foreign Application Priority Data

Jun. 6, 2014 (JP) .................................. 2014-117493

(51) Int. Cl.
*G06F 17/30* (2006.01)
*G06Q 10/10* (2012.01)

(52) U.S. Cl.
CPC .. *G06F 17/30528* (2013.01); *G06F 17/30312* (2013.01); *G06F 17/30477* (2013.01); *G06F 17/30864* (2013.01); *G06Q 10/105* (2013.01)

(58) Field of Classification Search
CPC ..................... G06F 17/30893; G06F 17/30864
See application file for complete search history.

(56) References Cited

U.S. PATENT DOCUMENTS

| | | | | |
|---|---|---|---|---|
| 5,862,223 | A * | 1/1999 | Walker | G06Q 10/063112 705/50 |
| 6,694,314 | B1 * | 2/2004 | Sullivan | G06F 17/30985 |
| 7,552,199 | B2 * | 6/2009 | Pomerantz | G06Q 10/06 434/118 |
| 7,904,652 | B1 * | 3/2011 | Castelli | G06F 3/0605 709/225 |
| 8,095,764 | B1 * | 1/2012 | Bauer | G06F 3/0605 711/162 |
| 2003/0069877 | A1 * | 4/2003 | Grefenstette | G06F 17/30643 |
| 2005/0027696 | A1 * | 2/2005 | Swaminathan | G06Q 10/06 |
| 2005/0050210 | A1 * | 3/2005 | Kennedy | G06Q 10/06 709/229 |
| 2007/0022109 | A1 * | 1/2007 | Imielinski | G06F 17/30401 |
| 2007/0260587 | A1 * | 11/2007 | Mohan | G06Q 10/06 |

(Continued)

FOREIGN PATENT DOCUMENTS

JP  9-245053 A  9/1997
JP  2001-222607 A  8/2001

OTHER PUBLICATIONS

Gonzalez et al., "Knowledge management-centric help desk: specification and performance evaluation", 2004, Elsevier.*

(Continued)

*Primary Examiner* — Apu M Mofiz
*Assistant Examiner* — Sheryl L Holland
(74) *Attorney, Agent, or Firm* — Sughrue Mion, PLLC

(57) ABSTRACT

An answerer extraction system includes a receiving unit that receives a question from an asker, a recording unit that records a reference history of the asker's referencing past questions or answers, and an extraction unit that extracts an answerer who is to answer the question on the basis of the reference history of the asker.

20 Claims, 28 Drawing Sheets

(56) References Cited

U.S. PATENT DOCUMENTS

| | | | | |
|---|---|---|---|---|
| 2008/0091406 A1* | 4/2008 | Baldwin | ................ | G10L 15/22 |
| | | | | 704/4 |
| 2013/0003957 A1* | 1/2013 | Singh | .................... | H04M 3/493 |
| | | | | 379/218.01 |
| 2013/0326380 A1* | 12/2013 | Lai | ....................... | G06F 3/0481 |
| | | | | 715/765 |

OTHER PUBLICATIONS

Buecheler et al., "Crowdsourcing, Open Innovation and Collective Intelligence in the Scientific Method: A Research Agenda and Operational Framework", 2010, Proceedings of the Alife XII Conference, Odense, Denmark.*

Rudd et al., "Undergraduate Agriculture Student Learning Styles and Critical Thinking Abilities: Is There a Relationship?", 2000, Journal of Agricultural Education, vol. 41, Issue 3.*

* cited by examiner

| No | MESSAGE ID |
|---|---|
| 1 | msgID-aaaaaa1-10 |
| 2 | msgID-aaaaaa1-11 |
| 3 | msgID-aaaaaa1-12 |
| 4 | msgID-aaaaaa1-14 |

| No | MESSAGE ID |
|---|---|
| 1 | msgID-ccccccc5-30 |
| 2 | msgID-ccccccc5-31 |
| 3 | msgID-ccccccc5-32 |
| 4 | msgID-ccccccc5-34 |

| CATEGORY | KNOWLEDGE LEVEL |
|---|---|
| DdddWwwww | 5 |
| DdddSssss | 3 |
| DOCUMENT MANAGEMENT | 2 |

| MESSAGE ID 2705 | REGISTRANT ID 2710 | REGISTRATION TIME 2715 | REGISTERED CONTENT 2720 | TYPE 2725 | STATUS 2730 | SOLVE TIME 2735 | PREVIOUS MESSAGE ID 2740 | NEXT MESSAGE ID 2745 | faqID 2750 | CATEGORY 2755 |
|---|---|---|---|---|---|---|---|---|---|---|
| msgID-bbbbbb3-30 | bbbbbb3 | | | ANSWER | SOLVED | | | | faq000102 | |
| msgID-aaaaaa1-10 | aaaaaa1 | 17:34 3/22/2014 | I CAN'T INSTALL X | QUESTION | ONGOING | | 0 | msgID-cccccc5-30 | 0 | |
| msgID-cccccc5-30 | cccccc5 | 18:24 3/22/2014 | UNINSTALL OLD VERSION OF X FIRST ··· | ANSWER | ONGOING | | msgID-aaaaaa1-10 | 0 | 0 | |
| | | | | | | | | | 0 | |

| No | faqID | SESSION ID | REFERENCE TIME | SOLVE TIME | SELF-SOLVING | EFFECTIVENESS |
|---|---|---|---|---|---|---|
| 1 | faq000012 | ... | 15:02 2/20/2014 | 15:02 2/21/2014 | 1 | 3 |
| 2 | faq000023 | ... | 15:04 3/5/2014 | 17:04 3/5/2014 | 2 | 2 |
| 3 | faq000102 | ... | 15:04 3/22/2014 | | | |
| 4 | msgID-cccccc5-32 | ... | 15:05 3/22/2014 | | | |
| 5 | msgID-cccccc5-30 | ... | 17:04 3/22/2014 | | | |

FIG. 30

| No | faqID | SESSION ID | REFERENCE TIME | SOLVE TIME | SELF-SOLVING | EFFECTIVENESS |
|----|-------|------------|----------------|------------|--------------|---------------|
| 1 | faq000042 | ... | 13:02 12/11/2013 | 10:02 12/20/2013 | 1 | 1 |
| 2 | faq000162 | ... | 14:04 1/14/2014 | 17:04 1/28/2014 | 1 | 1 |
| 3 | msgID-ccccccc5-32 | ... | 10:04 2/20/2014 | | | |
| 4 | faq003012 | ... | 11:04 2/28/2014 | | | |

FIG. 31A

| 3105 | 3110 | 3115 | 3120 | 3130 |
|---|---|---|---|---|
| No | USER ID | SEARCH TIME | SEARCH PARAMETER | faqID LIST |
| 1 | aaaaaa1 | 15:02 3/22/2014 | METHOD OF INSTALLING X | |
| 2 | aaaaaa1 | 15:02 3/22/2014 | CAN'T INSTALL VERSION Y OF X | |
| 3 | aaaaaa1 | 15:02 3/22/2014 | | |

| 3142 | 3144 |
|---|---|
| faq001002 | TRY xxx. |
| faq001012 | APPLY x11. |

| 3152 | 3154 |
|---|---|
| faq001015 | TRY yyy. |
| faq001022 | TRY y22. |

Figures 32A, 32B:
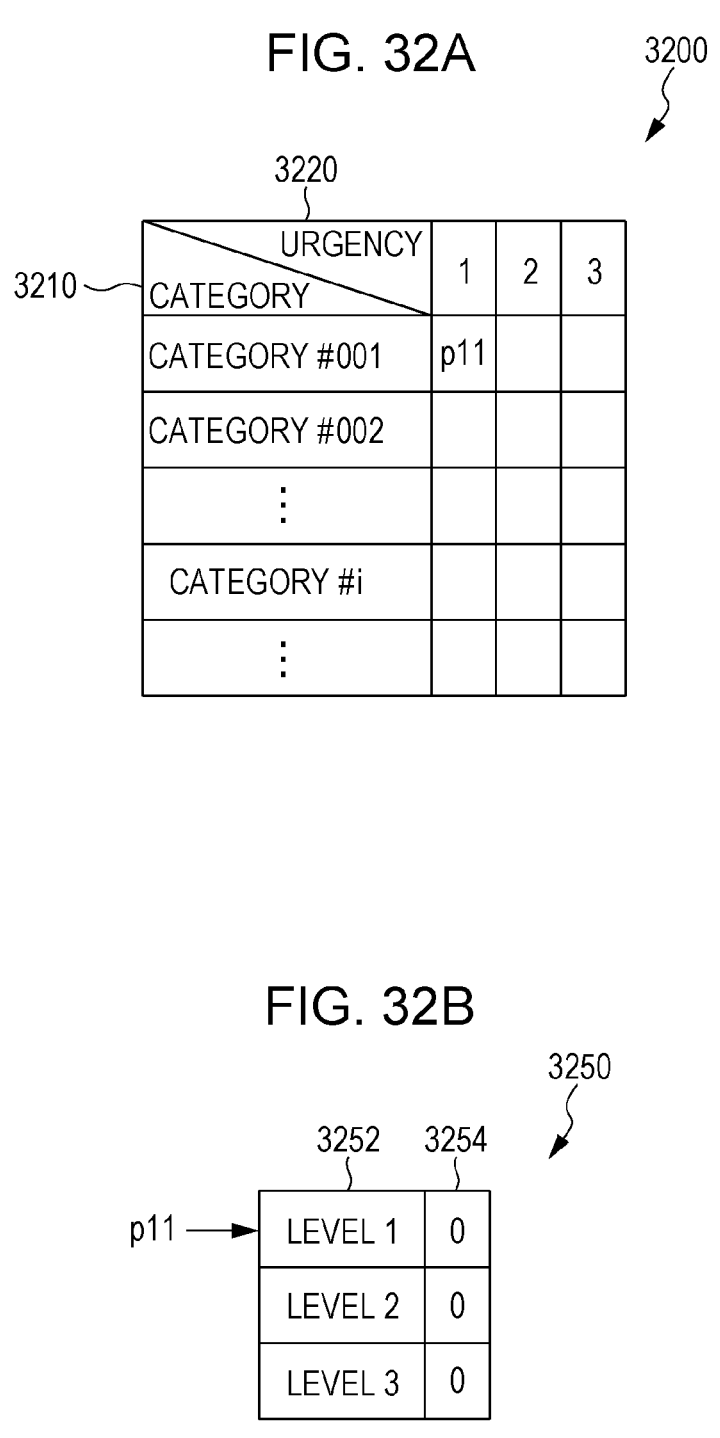

3220 — URGENCY

3210 — CATEGORY

| | 1 | 2 | 3 |
|---|---|---|---|
| CATEGORY #001 | p11 | | |
| CATEGORY #002 | | | |
| ⋮ | | | |
| CATEGORY #i | | | |
| ⋮ | | | |

| LEVEL 1 | 0 |
|---|---|
| LEVEL 2 | 0 |
| LEVEL 3 | 0 |

FIG. 35A
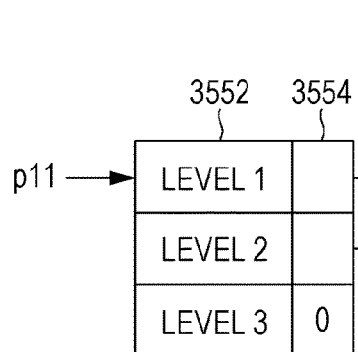
FIG. 35B    FIG. 35C    FIG. 35D
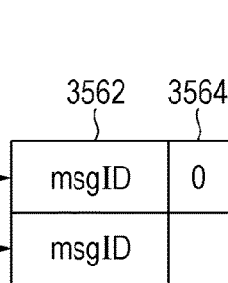
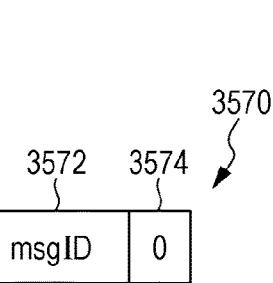

| MESSAGE ID | KW1 | KW2 | KW3 | KW4 | KW5 | KW6 | KW7 | KW8 | KW9 | ... |
|---|---|---|---|---|---|---|---|---|---|---|
| msgID-aaaaaa1-10 | 0 | 0 | 1 | 0 | 1 | 0 | 1 | 0 | 1 | |
| Msg-00001 | | | | | | | | | | |
| Msg-00002 | | | | | | | | | | |
| Msg-00003 | | | | | | | | | | |
| Msg-00004 | | | | | | | | | | |
| Msg-00005 | | | | | | | | | | |
| Msg-00006 | | | | | | | | | | |
| Msg-00007 | | | | | | | | | | |
| Msg-00008 | 1 | 0 | 0 | 1 | 0 | 0 | 1 | 1 | 0 | |
| | | | | | | | | | | |

| USER ID | CN1 | CN2 | CN3 | CN4 | CN5 | CN6 | CN7 | CN8 | CN9 | ... |
|---|---|---|---|---|---|---|---|---|---|---|
| aaaaaa1 | 0.1 | 0 | 0.1 | 0 | 0 | 0 | 0 | 0 | 0 | 0 |
|  |  |  |  |  |  |  |  |  |  |  |
|  |  |  |  |  |  |  |  |  |  |  |
|  |  |  |  |  |  |  |  |  |  |  |
| bbbbbb3 | 0.8 | 0.3 | 0.5 | 0 | 0 | 0 | 0 | 0 | 0 | 0 |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |
|  |  |  |  |  |  |  |  |  |  |  |

3710  3721 3722 3723 3724 3725 3726 3727 3728 3729

ANSWERER EXTRACTION SYSTEM, ANSWERER EXTRACTION METHOD, AND NON-TRANSITORY COMPUTER-READABLE MEDIUM

CROSS-REFERENCE TO RELATED APPLICATIONS

This application is based on and claims priority under 35 USC 119 from Japanese Patent Application No. 2014-117493 filed Jun. 6, 2014.

BACKGROUND

Technical Field

The present invention relates to an answerer extraction system, an answerer extraction method, and a non-transitory computer-readable medium.

SUMMARY

According to an aspect of the invention, there is provided an answerer extraction system that includes a receiving unit that receives a question from an asker, a recording unit that records a reference history of the asker's referencing past questions or answers, and an extraction unit that extracts an answerer who is to answer the question on the basis of the reference history of the asker.

BRIEF DESCRIPTION OF THE DRAWINGS

Exemplary embodiments of the present invention will be described in detail based on the following figures, wherein:

FIG. 21 is an explanatory diagram illustrating an exemplary data structure of a question list;

FIG. 22 is an explanatory diagram illustrating an exemplary data structure of an answer list;

FIG. 23 is an explanatory diagram illustrating an exemplary data structure of a knowledge level table;

FIG. 27 is an explanatory diagram illustrating an exemplary data structure of a message table;

FIG. 30 is an explanatory diagram illustrating an exemplary data structure of an important discussion or message reference history table;

FIGS. 31A to 31C are explanatory diagrams illustrating an exemplary data structure of a search history table;

FIGS. 32A and 32B are explanatory diagrams illustrating an exemplary data structure of an unanswered question table;

FIGS. 35A to 35D are explanatory diagrams illustrating an exemplary data structure of an unanswered table;

FIG. 36 is an explanatory diagram illustrating an exemplary data structure of a message/keyword vector representation table;

FIG. 37 is an explanatory diagram illustrating an exemplary data structure of a user/category name vector representation table.

DETAILED DESCRIPTION

Hereinafter, an exemplary embodiment related to realizing the present invention will be described by way of example on the basis of the drawings.

Figure 1:
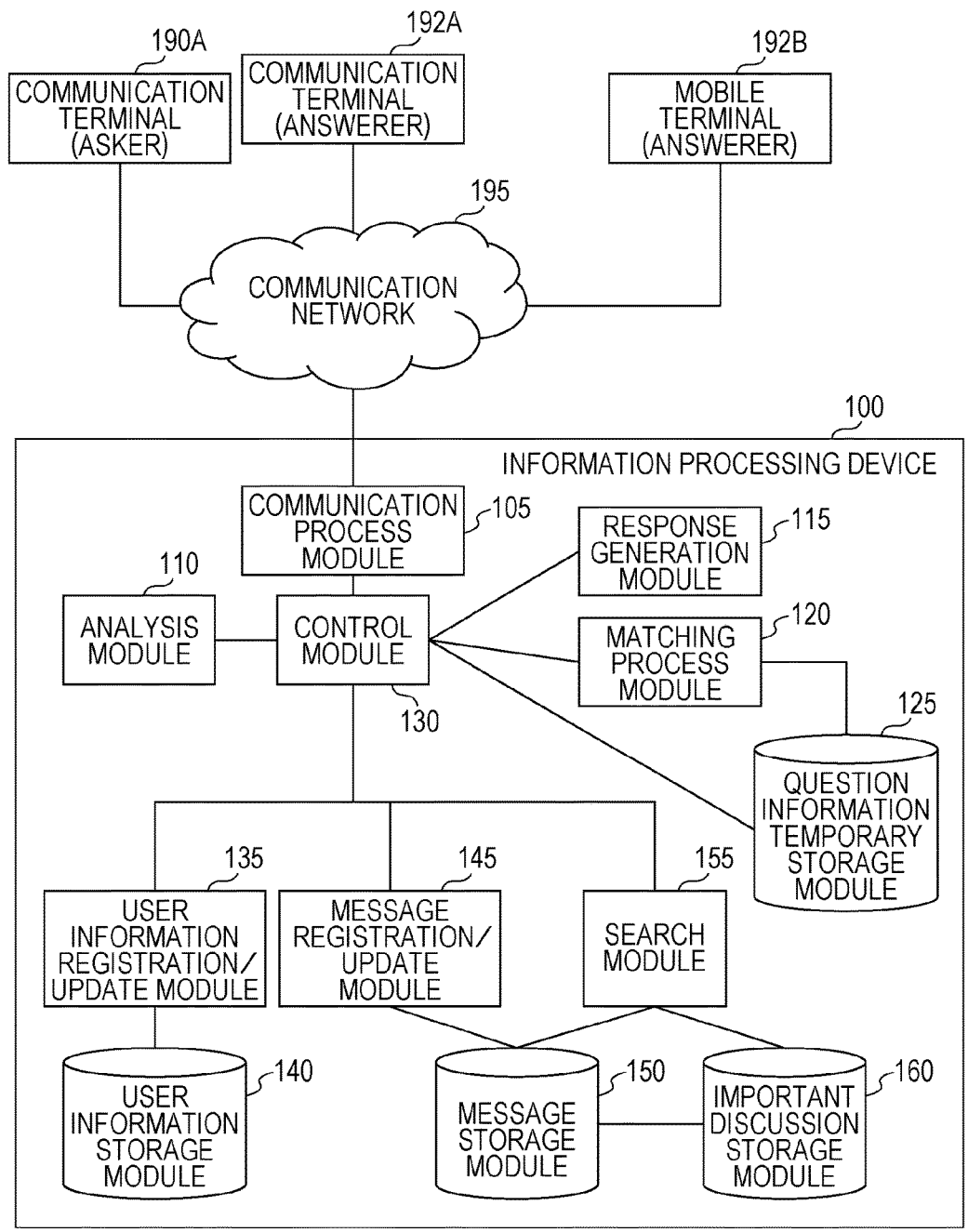
FIG. 1 is a schematic module configuration diagram for an exemplary configuration according to an exemplary embodiment.

FIG. 1 illustrates a schematic module configuration for an exemplary configuration according to the exemplary embodiment.

Note that the term module refers to components such as software (computer programs) and hardware which are typically capable of being logically separated. Consequently, the term module in the exemplary embodiment not only refers to modules in a computer program, but also to modules in a hardware configuration. Thus, the exemplary embodiment also serves as a description of a computer program (a program that causes a computer to execute respective operations, a program that causes a computer to function as respective units, or a program that causes a computer to realize respective functions), a system, and a method for inducing functionality as such modules. Note that although terms like "store" and "record" and their equivalents may be used in the description for the sake of convenience, these terms mean that a storage device is made to store information or that control is applied to cause a storage device to store information in the case where the exemplary embodiment is a computer program. Also, while modules may be made to correspond with function on a one-to-one basis, some implementations may be configured such that one program constitutes one module, such that one program constitutes multiple modules, or conversely, such that multiple programs constitute one module. Moreover, multiple modules may be executed by one computer, but one module may also be executed by multiple computers in a distributed or parallel computing environment. Note that a single module may also contain other modules. Also, the term "connection" may be used hereinafter to denote logical connections (such as the transfer of data and referential relationships between instructions and data) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of multiple "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted.

Also, the terms "system" and "device" not only encompass configurations in which multiple computers, hardware, or devices are connected by a communication medium such as a network (including connections that support 1-to-1 communication), but also encompass configurations realized by a single computer, hardware, or device. The terms "device" and "system" are used interchangeably. Obviously, the term "system" does not include merely artificially arranged social constructs (social systems).

Also, every time a process is conducted by each module or every time multiple processes are conducted within a module, information to be processed is retrieved from a storage device, and the processing results are written back to the storage device after the processing. Consequently, description of the retrieval from a storage device before processing and the writing back to a storage device after processing may be reduced or omitted in some cases. Note that the storage device herein may include a hard disk, random access memory (RAM), an auxiliary or external storage medium, a storage device accessed via a communication link, and a register or the like inside a central processing unit (CPU).

An information processing device 100 according to the present embodiment extracts an answerer who is to answer a question and responds to an asker with an answer by that answerer, and as illustrated by the example of FIG. 1, includes a communication process module 105, an analysis module 110, a response generation module 115, a matching process module 120, a question information temporary storage module 125, a control module 130, a user information registration/update module 135, a user information storage module 140, a message registration/update module 145, a message storage module 150, a search module 155, and an important discussion storage module 160.

In addition, the information processing device 100 is connected to devices such as a communication terminal (asker) 190A, a communication terminal (answerer) 192A, and a communication terminal (answerer) 192B via a communication network 195. The communication network 195 may be wireless, wired, or a combination of the two, and may use a network such as the Internet or an intranet as a communication infrastructure, for example. The communication terminal (asker) 190A is a terminal used by an asker to transmit a question to the information processing device 100 and receive an answer to the question from the information processing device 100, and may be a mobile terminal (such as a smartphone or other mobile phone, or a notebook computer) insofar as the device is able to communicate. The communication terminal (answerer) 192A and the communication terminal (answerer) 192B are terminals used by an answerer to receive a question from the information processing device 100 and transmit an answer to the question to the information processing device 100. The communication terminal (answerer) 192B is a mobile terminal used by an answerer to transmit an answer to a question to the information processing device 100. Obviously, there may also be multiple communication terminals (asker) 190A and the like.

The communication process module 105 is connected to the control module 130, and is also connected to the communication terminal (asker) 190A, the communication terminal (answerer) 192A, and the communication terminal (answerer) 192B via the communication network 195. The communication process module 105 is positioned between the communication network 195 and the control module 130, and conducts a message communication process. Specifically, the communication process module 105 communicates with devices such as the communication terminal (asker) 190A, transmitting information from the control module 130 to the communication terminal (asker) 190A and the like, and passing information received from the communication terminal (asker) 190A and the like to the control module 130.

The analysis module 110 is connected to the control module 130. The analysis module 110 analyzes question content, and extracts an expression pattern. In addition, the analysis module 110 may be configured to conduct an analysis process for conducting matching using a self-solving ability per category and a level per category in order to assign an answerer of suitable level who matches the category of the question.

The response generation module 115 is connected to the control module 130. The response generation module 115 generates data to be displayed to an asker or an answerer.

The matching process module 120 is connected to the question information temporary storage module 125 and the control module 130. The matching process module 120 receives a question from an asker, and subsequently extracts an answerer on the basis of a reference history recorded in the message storage module 150 for that asker.

In addition, the matching process module 120 may also be configured to compute, from the asker's reference history in the message storage module 150, the degree that indicates the asker's ability to solve a problem by him- or herself. The matching process module 120 may then extract an answerer who is to answer the question using the computed degree (self-solving ability) and answerer candidates' knowledge information in the user information storage module 140. The matching process module 120 may also extract an answerer by conducting matching using the computed degree (self-solving ability) and the knowledge information.

In addition, the matching process module 120 may also be configured to compute, from the asker's reference history in the message storage module 150, the degree that indicates how much the asker researched before posting the question being processed. The matching process module 120 may then extract an answerer using the computed degree (preliminary research history or preliminary research level) and answerer candidates' knowledge information in the user information storage module 140. The matching process module 120 may also extract an answerer who is to answer the question by conducting matching using the computed degree (preliminary research history) and the knowledge information. Also, a reference history recorded before the question may be used as the reference history. Herein, "before the question" means before receiving the question, and refers to a predetermined period or a predetermined number of searches starting back from when the question was received.

For example, the matching process module 120 matches an asker and an answerer using the information in the user information storage module 140 and the message storage module 150. An answerer at the same or higher level than the asker is assigned according to both the category of the question and a behavioral history of the asker (preliminary research history and/or self-solving ability).

The control module 130 is connected to the communication process module 105, the analysis module 110, the response generation module 115, the matching process module 120, the question information temporary storage module 125, the user information registration/update module 135, the message registration/update module 145, and the search module 155. The control module 130 controls the modules inside the information processing device 100. In addition, if the asker's ability to solve a problem by him- or herself (self-solving ability) or the degree that indicates how much the asker has researched the question before the question is received (preliminary research history) computed by the matching process module 120 is equal to or greater than a predetermined threshold value, the control module 130 may cause at least one of a question and an answer to that question to be stored in the important discussion storage module 160 as an important discussion.

The question information temporary storage module 125 is connected to the matching process module 120 and the control module 130. The question information temporary storage module 125 stores unanswered question messages classified by category, priority, and level.

In addition, the matching process module 120 may also be configured to use the information in the question information temporary storage module 125 to group questions by category, urgency, and asker level, and assign a suitable answerer to the first question in each group, rather than assigning one answerer to one question. Furthermore, the control module 130 may also be configured so that when an answer is made for a question or when a question is solved, the control module 130 reports the answer or solution result to the users of questions in the same group as the question. In other words, the question information temporary storage module 125 may also be configured to function as a buffer for answerers when a large number of questions are registered in a short time.

The user information registration/update module 135 is connected to the control module 130 and the user information storage module 140. The user information registration/update module 135 registers and updates user information (including answerer candidate knowledge information and the like) in the user information storage module 140.

The user information storage module 140 is connected to the user information registration/update module 135. The user information storage module 140 stores information such as answerer candidate knowledge information. For example, besides basic information about a user (such as user identification information (UID) that uniquely identifies a user, and a user name), the user information storage module 140 also stores user information such as a question-and-answer history, categories that the user knows, self-solving ability, and preliminary research history (see FIGS. 20 to 26). In addition, the user information may also include a knowledge level per category.

The message registration/update module 145 is connected to the control module 130 and the message storage module 150. The message registration/update module 145 registers and updates messages such as questions and answers in the message storage module 150.

The message storage module 150 is connected to the message registration/update module 145, the search module 155, and the important discussion storage module 160. The message storage module 150 stores a reference history (a history of an asker's references to past questions and answers (Q&A)) referenced by the search module 155. For example, the message storage module 150 stores messages while also including the type, such as question or answer, and the status.

The search module 155 is connected to the control module 130, the message storage module 150, and the important discussion storage module 160. The search module 155, in response to an asker's search instruction, searches for a past question or answer stored in the important discussion storage module 160 or the message storage module 150. Subsequently, that reference history (search history) is stored in the message storage module 150. Note that the searched content may be any of past questions, past answers, or past questions and past answers. The message storage module 150 then treats the search results as answer candidates for the received question.

The important discussion storage module 160 is connected to the message storage module 150 and the search module 155. The important discussion storage module 160 stores important discussions according to a process by the control module 130. In other words, the important discussion storage module 160 stores questions from users with a high self-solving ability, and/or solved answers to such questions. Note that, instead of the important discussion storage module 160, the message storage module 150 may also be configured to set and store an important discussion flag. Information such as frequently asked questions (FAQs) may also be stored as important discussions, for example.

Note that the question information temporary storage module 125 and the important discussion storage module 160 may be additional (optional) structural elements.

Figure 2:
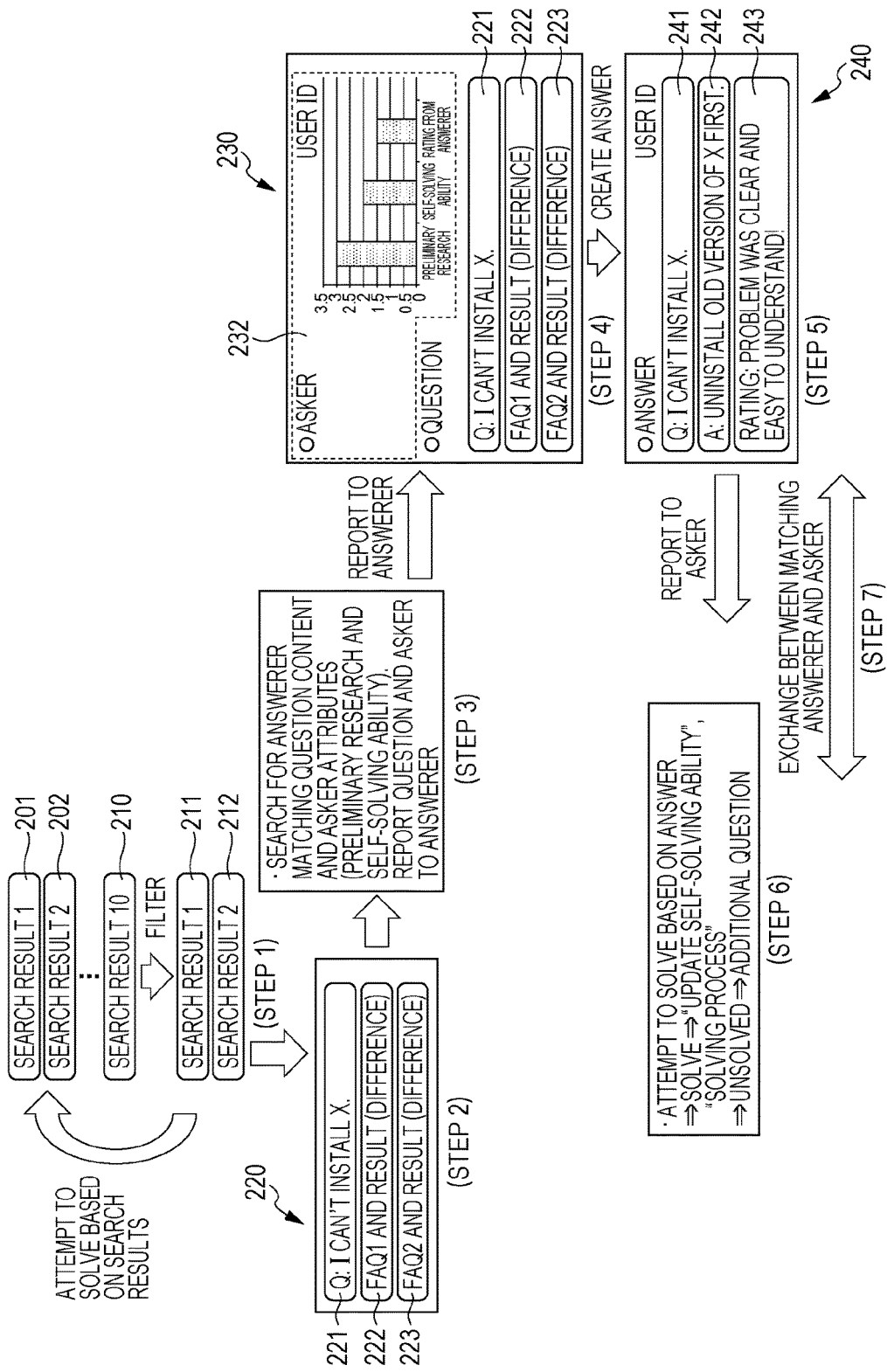
FIG. 2 is an explanatory diagram illustrating exemplary processing according to the exemplary embodiment.

FIG. 2 is an explanatory diagram illustrating exemplary processing according to the exemplary embodiment. Note that this description is intended to aid comprehension of the exemplary embodiment.

In (Step1), the asker attempts to solve a problem on the basis of search results. In other words, in this phase, the asker attempts to solve the problem by him- or herself before asking (posting) a question, such as by searching for past Q&As or important discussions. For example, according to an operation by the asker, a search result 1 (201), search result 2 (202), and the like are filtered, and the search result 1 (211) and search result 2 (212) and the like are detected. Additionally, when a search instruction is received, information such as the user ID, search query, search time, result, and session ID are recorded. This information is then used to compute the preliminary research level or determine the category, and used for matching to extract an answerer.

In (Step2), the asker gives up on self-solving and asks a question. Note that if the asker solves the problem by him- or herself, the asker's self-solving ability is calculated on the basis of the record of self-solving. For example, a question is entered into a question field 221 on a question screen 220, and differences from past search results (such as the reason why the problem was not solved with search result 1 (211) or the like) are entered into a supplementary field 222 and a supplementary field 223. For example, "Q: I can't install X" is entered into the question field 221, "FAQ1 and result (difference)" is entered into the supplementary field 222, and "FAQ2 and result (difference)" is entered into the supplementary field 223.

In (Step3), a search is conducted for an answerer matching the question content and/or the asker's attributes (preliminary research history, self-solving ability). Information about the question and the asker is reported to the answerer. In addition, if there are no preliminary searches, similar FAQs may be returned. Also, similar questions may also be added to an unanswered table.

Figure 3:
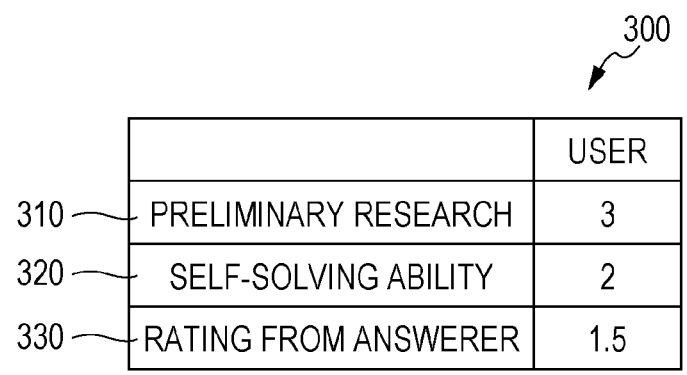
FIG. 3 is an explanatory diagram illustrating an exemplary data structure of an asker attribute table.

In (Step4), as a result of the asker's question and the like being reported to the answerer's communication terminal (answerer) 192, an asker data presentation area 232 displaying a graph of the asker's attributes, and the question field 221, supplementary field 222, and supplementary field 223 displaying the question content and the like are displayed on a report screen 230. In the asker data presentation area 232, a graph representation of data in an asker attribute table 300 exemplified in FIG. 3 is presented. Obviously, the data presented at this point is data in the asker attribute table 300 related to the user who entered the question into the question screen 220, and is displayed in order to inform the answerer of the asker's ability and the like. FIG. 3 is an explanatory diagram illustrating an exemplary data structure of the asker attribute table 300. The asker attribute table 300 includes a preliminary research field 310, a self-solving ability field 320, and a rating from answerer field 330. The preliminary research field 310 stores the preliminary research level of that asker. The self-solving ability field 320 stores the self-solving ability of that asker. The rating from answerer field 330 stores a rating for that asker by past answerers.

In (Step5), the answerer creates an answer to the question. For example, in response to the question in a question field 241 on an answer entry screen 240, the answerer enters an answer into an answer field 242, and enters a rating for the question in a rating field 243. This content is reported and displayed on the asker's communication terminal (asker) 190A. The content of the question field 241 is the same as the question field 221. For example, "A: Uninstall old version of X first" is entered into the answer field 242, and "Rating: Problem was clear and easy to understand!" is entered into the rating field 243.

In (Step6), the asker attempts to solve the problem on the basis of the answer. If the asker solves the problem, "update self-solving ability" and "solving process" are conducted. If the problem is still unsolved, the asker may transmit additional questions and the like to the answerer in (Step7) and thereafter.

In (Step7), an exchange between the matching answerer and asker is conducted after (Step6).

Figure 4:
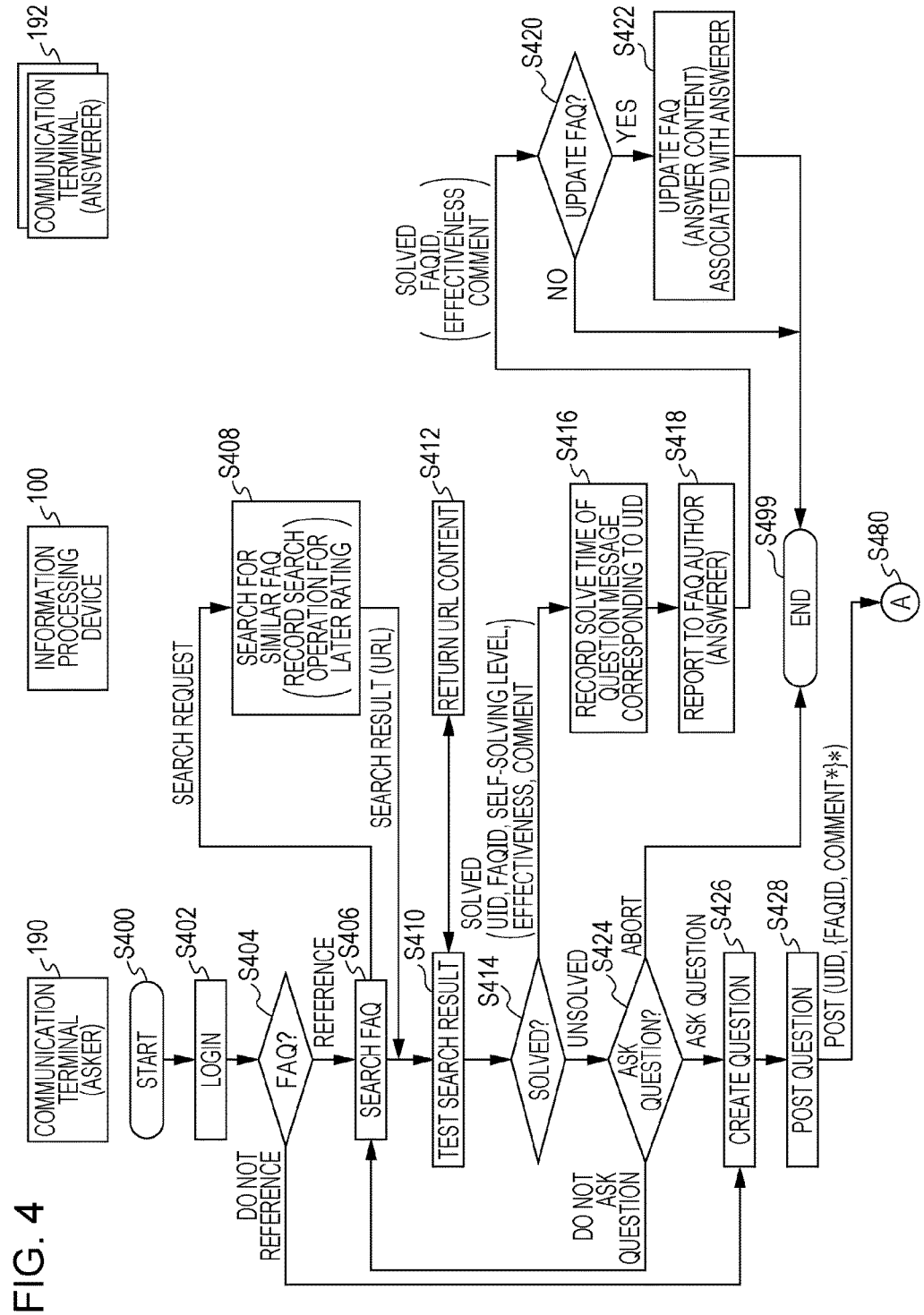
FIG. 4 is a flowchart illustrating an exemplary process according to an exemplary embodiment.

FIG. 4 is a flowchart illustrating an exemplary process according to the exemplary embodiment. The flowchart illustrates a process conducted by the communication terminal (asker) 190, information processing device 100, and the communication terminal (answerer) 192. This applies similarly to FIGS. 5 to 8 hereinafter.

In step S402, the communication terminal (asker) 190 inputs a user ID and password and requests authentication from the information processing device 100. If authentication is successful, the process proceeds to step S404.

In step S404, the communication terminal (asker) 190 decides whether or not to reference a FAQ according to an operation by the asker. In the case of referencing a FAQ, the process proceeds to step S406, and in the case of not referencing a FAQ, the process proceeds to step S426.

In step S406, the communication terminal (asker) 190, according to an operation by the asker, receives a search request for a FAQ, and requests the information processing device 100 to execute the search.

In step S408, the search request in step S406 is passed through the communication process module 105, the control module 130, and the search module 155 of the information processing device 100, and the search module 155 executes a similarity search on the question part or answer part of the message storage module 150 and the important discussion storage module 160. At this point, the search module 155 records the user's search history as a search history in the message storage module 150 for later rating (see the important discussion or message reference history table 3000 illustrated by the example of FIG. 30).

Figure 9:
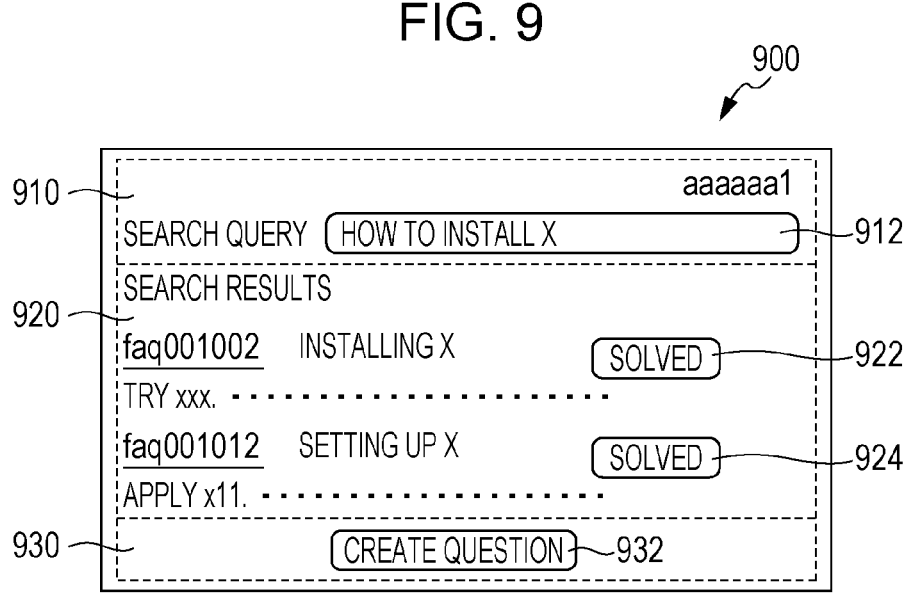
FIG. 9 is an explanatory diagram illustrating an example of a search request and results screen.

In step S410, the communication terminal (asker) 190, according to a user operation, displays search results returned by the similarity search (see the search request and results screen 900 illustrated by the example of FIG. 9). The user tests whether or not the search results are helpful. By clicking on a FAQID (a URL link) included in the search result, the answer corresponding to the FAQID is displayed.

In step S412, if the FAQ URL is clicked, the information processing device 100 stores information such as the UID of the user who clicked the FAQ URL, and the reference time. Subsequently, the page content indicated by that URL is transmitted to the communication terminal (asker) 190 and displayed (see the solved question and answer message reply screen 1200 illustrated by the example of FIG. 12).

In step S414, the communication terminal (asker) 190, according to an operation by the asker, judges whether or not the problem was solved as a result of testing the search results. If the problem is solved, a Solved button 922 or 924 is pressed on the search results dialog box. Subsequently, an answer dialog box is displayed, and the asker registers information indicating that the problem is solved (see the dialog box 1000 after pushing a Solved button illustrated by the example of FIG. 10). When the Register button 1010 is pressed, the UID, FAQID, degree of self-solving (self-solving ability), and the effectiveness of the answer provided as a search result are passed to the information processing device 100. If the problem is not solved, the process proceeds to step S424.

Figure 29:
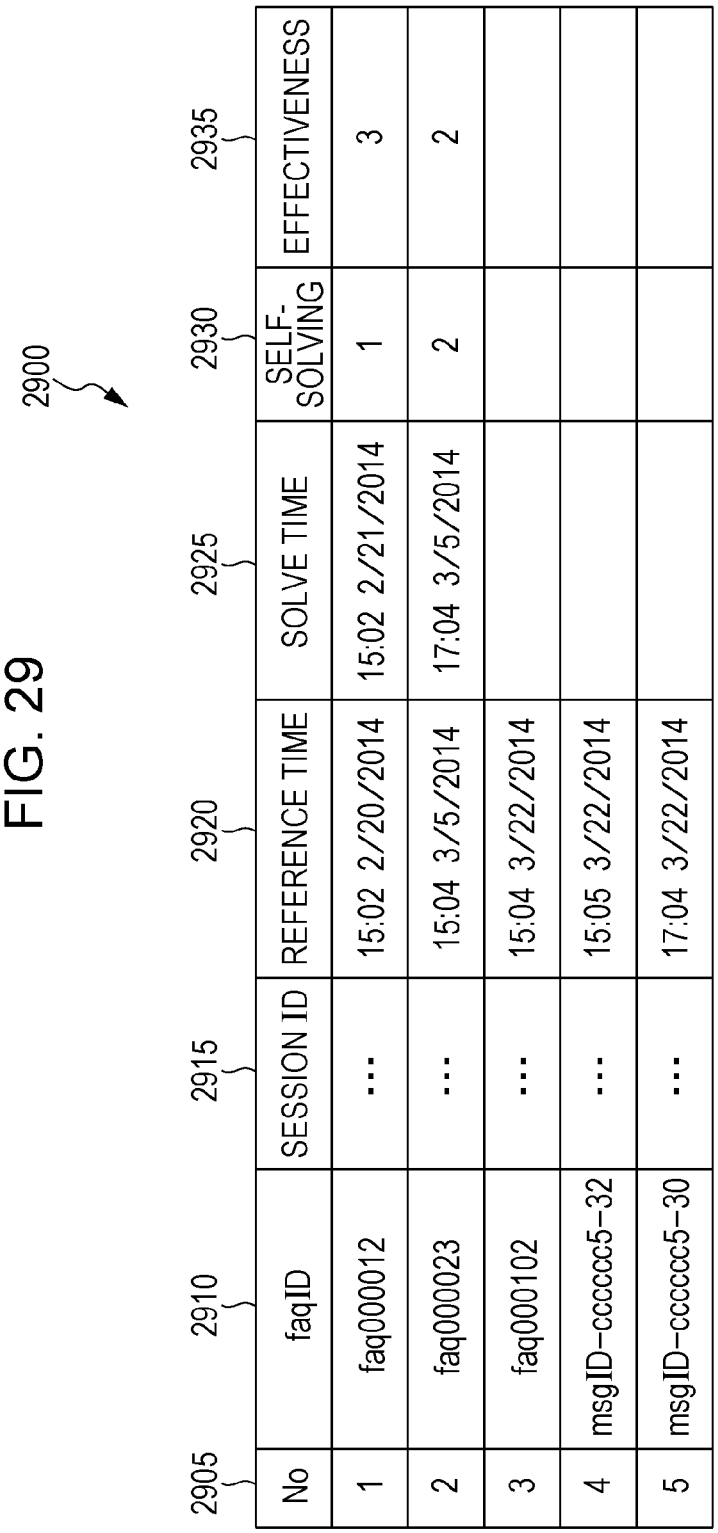
FIG. 29 is an explanatory diagram illustrating an exemplary data structure of an important discussion or message reference history table.

In step S416, the information processing device 100 stores the referenced FAQID, reference time, solve time, self-solving ability, and effectiveness in a FAQ reference history (inside the message storage module 150) managed for each user (see the important discussion or message reference history table 2900 illustrated by the example of FIG. 29).

In step S418, the information processing device 100 reports the input performed by the asker who solved the problem to the author of the FAQ (answerer).

In step S420, the communication terminal (answerer) 192, according to an operation by the answerer, judges whether or not to update the FAQ. In the case of updating, the process proceeds to step S422, while in the case of not updating, the process ends (step S499).

In step S422, the communication terminal (answerer) 192 updates the FAQ (a FAQ associated with the answerer) with the asker's input (comment), and the process ends (step S499).

In step S424, the communication terminal (asker) 190, according to an operation by the asker, judges whether or not to register a question in the information processing device 100. In the case of asking a question, the process proceeds to step S426, while in the case of looking up a FAQ, the process returns to step S406 or stops (step S499).

Figure 11:
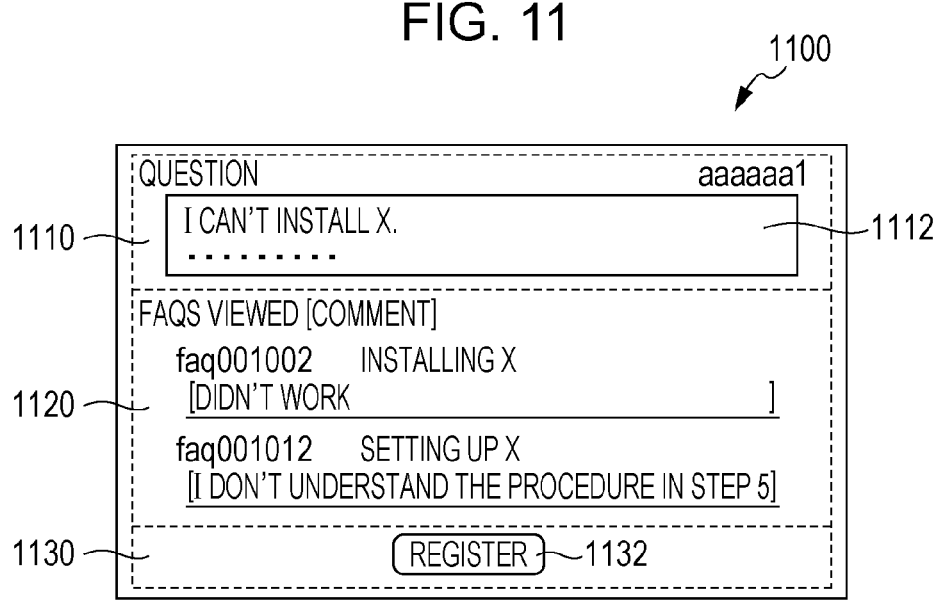
FIG. 11 is an explanatory diagram illustrating an example of a created question (before registration) screen.

In step S426, the communication terminal (asker) 190, according to an operation by the asker, displays a question screen if a Create Question button 932 on the search request and results screen 900 illustrated by the example in FIG. 9 is pressed (see the created question (before registration) screen 1100 illustrated by the example of FIG. 11). The asker inputs comments about FAQs as appropriate, and presses the Register button 1132.

In step S428, the communication terminal (asker) 190 transmits a question message (including the UID, and 0 or more sets of a FAQID and a comment for that FAQ) to the information processing device 100.

Figure 5:
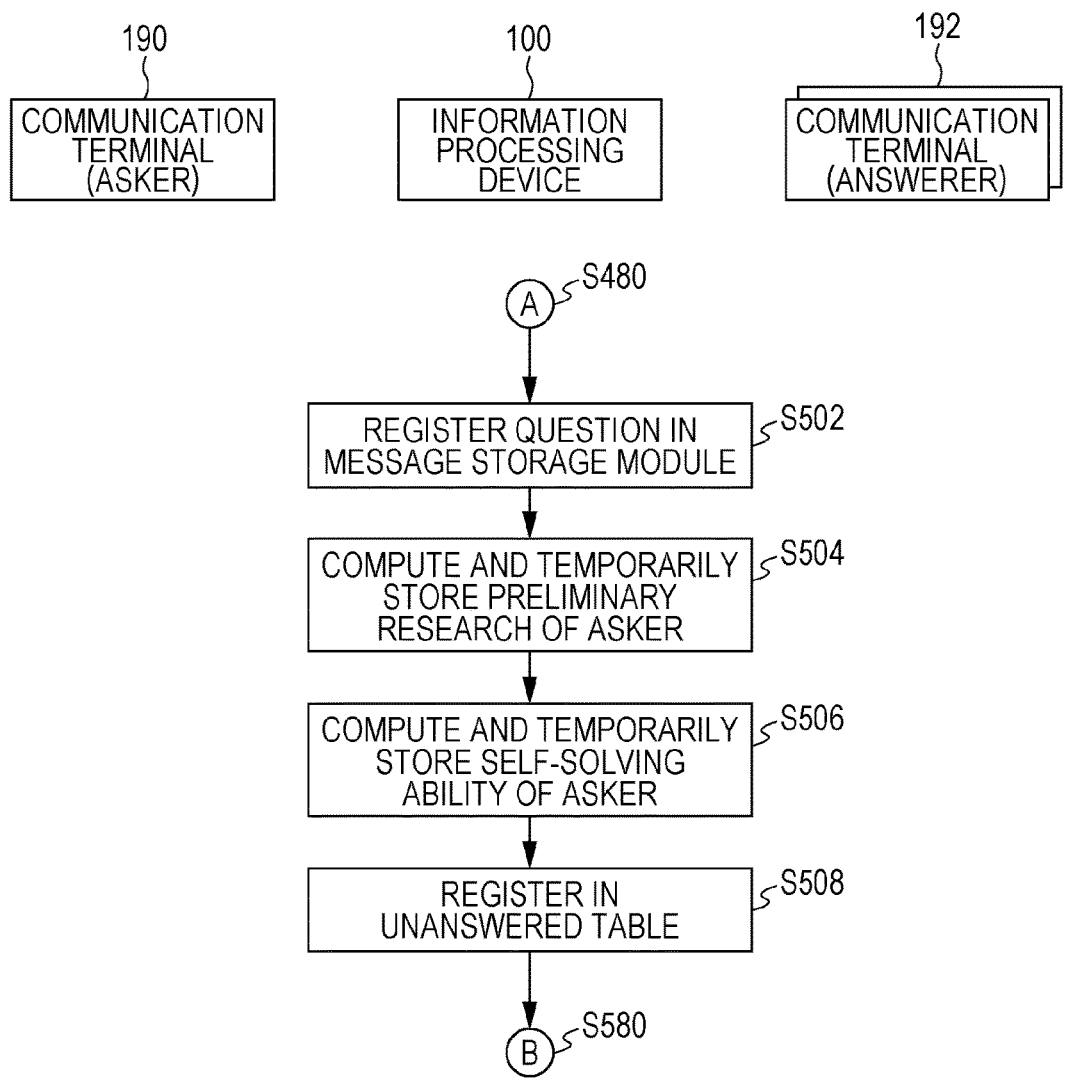
FIG. 5 is a flowchart illustrating an exemplary process according to the exemplary embodiment.

FIG. 5 is a flowchart illustrating an exemplary process according to the exemplary embodiment.

In step S502, the information processing device 100 registers the question message in the message storage module 150 (see the message table 2700 illustrated by the example of FIG. 27). The analysis module 110 extracts a category, and attaches category information to the message.

In step S504, the information processing device 100 computes the preliminary research level of the asker according to the reference time (reference time field 2920, reference time field 3020) in the message reference history (important discussion or message reference history table 2900, important discussion or message reference history table 3000) illustrated by the examples in FIGS. 29 and 30, and temporarily stores the computed result.

The preliminary research level is taken to be the number of messages for which the session ID while the user is searching is the same as the session ID in the user's reference history table. If a session expires due to aborting operation or the like during preliminary searching, after re-login a check is conducted for a session ID in which the date of the reference history is the same as the preliminary searching, and the number of messages with the same session ID is used to calculate the preliminary research level.

Alternatively, the preliminary research level may be defined as the number of referenced messages saved in memory of the search module 155 during preliminary searching. In this case, the number of referenced messages is saved in memory in association with the user ID and the session ID.

In the important discussion or message reference history table 2900 illustrated by the example of FIG. 29 or the important discussion or message reference history table 3000 illustrated by the example of FIG. 30, there are provided session ID fields 2915 and 3015, in which the session ID is saved. Although a configuration that stores the number of references in memory is simple, a method that saves the session ID may be selected to accommodate the following cases.

(Case 1) The case of verifying preliminary research going back into the past.

(Case 2) The case of supporting a situation in which the interval between the preliminary research operation and the question operation is lengthy, and the session expires.

In step S506, the information processing device 100 computes the self-solving ability of the asker from the history of problems that the asker solved him- or herself in the message reference history illustrated by the examples in FIGS. 29 and 30 (important discussion or message reference history table 2900, important discussion or message reference history table 3000), and temporarily stores the computed result.

The self-solving ability at this point is taken to be the maximum value of the self-solving ability in the user's reference history table.

In step S508, the information processing device 100 registers a question message in the unanswered table. Details will be discussed later using the flowchart illustrated by the example of FIG. 6. Note that step S508 is a process that presuppose the question information temporary storage module 125.

Figure 6:
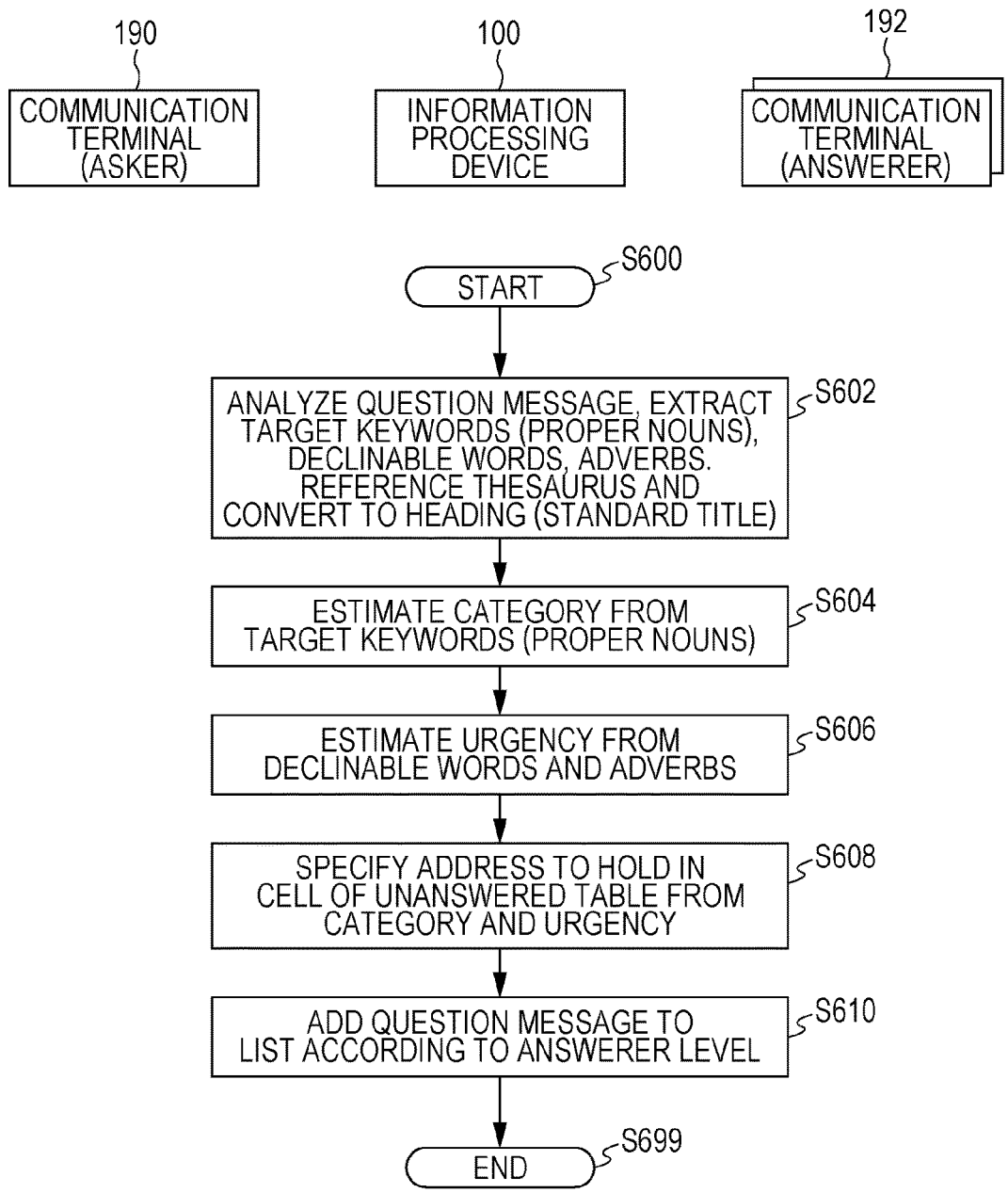
FIG. 6 is a flowchart illustrating an exemplary process according to an exemplary embodiment.

FIG. 6 is a flowchart illustrating an exemplary process according to the exemplary embodiment. The processes in each of these steps are processes that presuppose the question information temporary storage module 125.

In step S602, the information processing device 100 uses the analysis module 110 to divide the question message into sentences, analyze the sentences, and extract the structural words, such as target keywords (proper nouns), verbs, adjectives, adverbs, interjections, and auxiliary verbs. The structural words are converted to a heading (standard title) by referencing a thesaurus. Also, an expression pattern is extracted (a knowledge representation (KR) expression is extracted).

Figure 33:
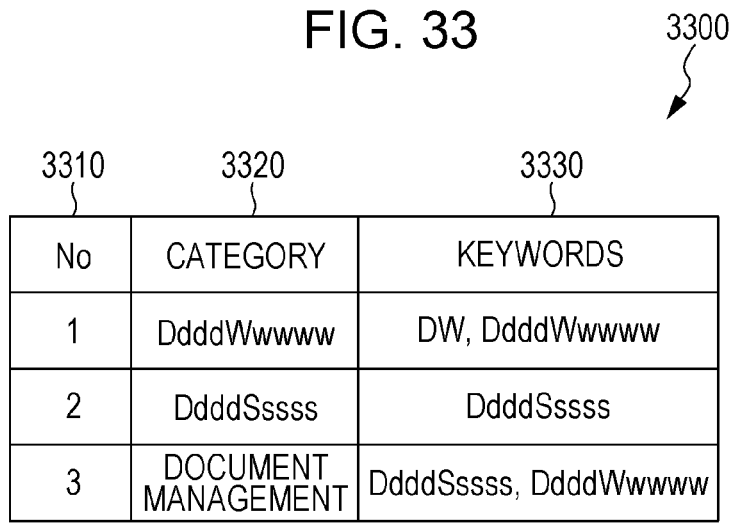
FIG. 33 is an explanatory diagram illustrating an exemplary data structure of a category determination table.

In step S604, the information processing device 100 estimates a category from the target keywords (proper nouns) (see the category determination table 3300 illustrated by the example of FIG. 33).

Figure 34:
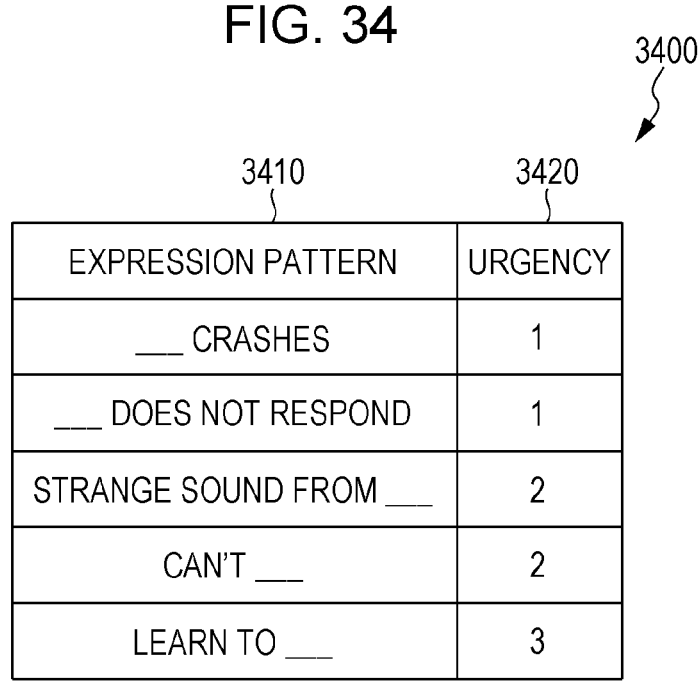
FIG. 34 is an explanatory diagram illustrating an exemplary data structure of an urgency determination table.

In step S606, the information processing device 100 estimates an urgency from the expression pattern (see the urgency determination table 3400 illustrated by the example of FIG. 34).

In step S608, the information processing device 100 specifies an address of a cell in the unanswered table from the category and urgency (see unanswered table 3200 illustrated by the example of FIGS. 32A and 32B; the cell of category #001, urgency 1).

Figure 24:
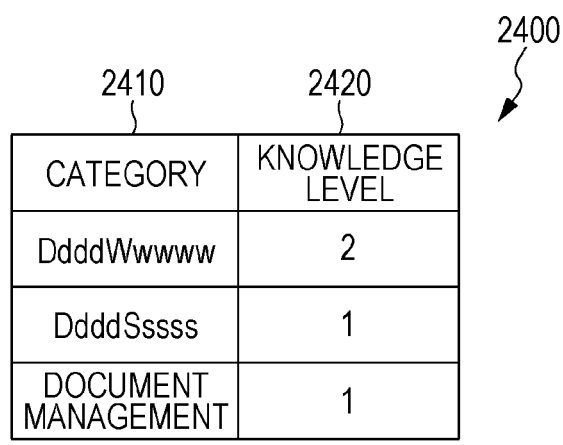
FIG. 24 is an explanatory diagram illustrating an exemplary data structure of a knowledge level table.
Figure 25:
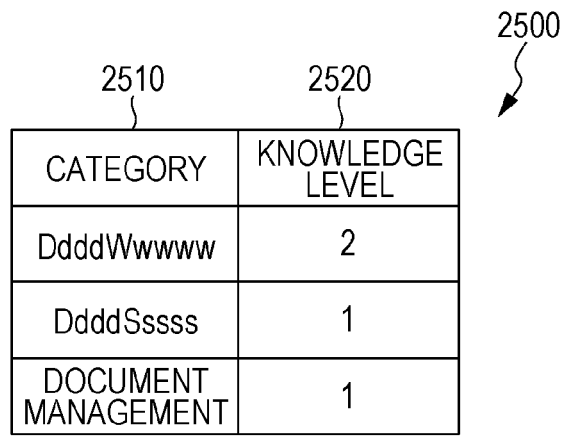
FIG. 25 is an explanatory diagram illustrating an exemplary data structure of a knowledge level table.
Figure 26:
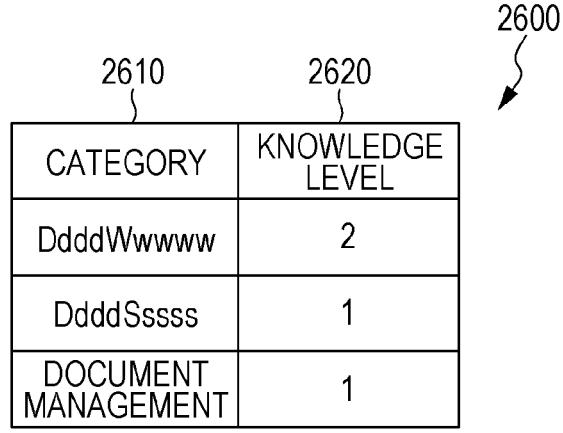
FIG. 26 is an explanatory diagram illustrating an exemplary data structure of a knowledge level table.

In step S610, the information processing device 100 adds the question message to a list according to the level of the asker (see the aaaaaa1 knowledge level table 2300 illustrated by the example of FIG. 23, the cccccc5 knowledge level table 2400 illustrated by the example of FIG. 24, the cccccc5 knowledge level table 2500 illustrated by the example of FIG. 25, and the dddddd71 knowledge level table 2600 illustrated by the example of FIG. 26).

Figure 7:
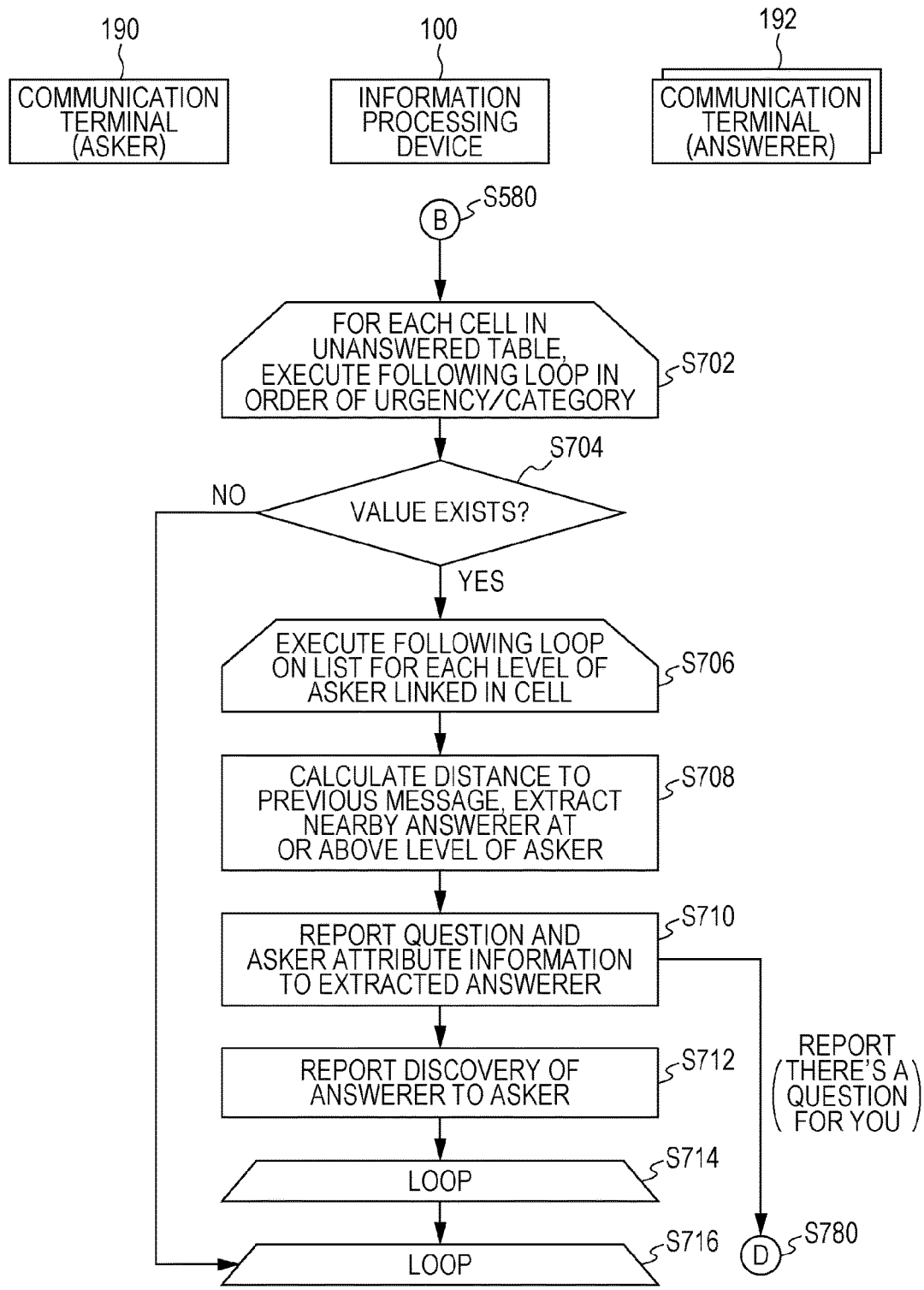
FIG. 7 is a flowchart illustrating an exemplary process according to an exemplary embodiment.

FIG. 7 is a flowchart illustrating an exemplary process according to the exemplary embodiment. Note that step S702, step S704, and step S706 are processes that presuppose the question information temporary storage module 125.

In step S702, the information processing device 100 executes the following loop process in order of urgency/category for each cell in the unanswered table. For example, in the case of a 2-row, 3-column table, provided that the cell number is expressed as (row number)–(column number), the process proceeds in the order of step S502, step S602, step S504, step S604, step S506, and step S606.

In step S704, the information processing device 100 checks whether or not the cell currently being processed contains a reference (pointer) to an unanswered list. If so, the process proceeds to step S706, and if not, the processing from step S706 to step S712 is skipped (see the unanswered table 3500 illustrated by the example of FIGS. 35A to 35D).

In step S706, the information processing device 100 executes the following loop process on the list per level of asker linked in the cell.

In step S708, the information processing device 100 calculates the distance to past messages, and extracts a nearby answerer at or above the level of the asker. Step S708 is made up of the following steps.

1) The distance is calculated between the question message at the beginning of the list and past messages. For example, specifically, the distance is calculated between vectors whose elements are words extracted from question sentences (see the message/keyword (KW) vector representation table 3600 illustrated by the example of FIG. 36).

2) The answerers of past messages whose distance is less than or equal to a predetermined value are temporarily stored.

3) The distances between the extracted answerers and the asker are calculated using a vector space model (see the user/category name (CN) vector representation table 3700 illustrated by the example of FIG. 37). At this point, the dimension of the vector is taken to be the category name, and the values are taken to be the level value of each category. The level values are computed according to the following formula, for example.

Asker level value=self-solving ability'*0.7+preliminary research level'*0.3 (the self-solving ability' and preliminary research level' are preprocessed to take a value from 0.0 to 1.0)

Answerer level value=per-category knowledge level of answerer (preprocessed to take a value within a range from 0.0 to 1.0)

4) The answerers are sorted according to the distance to the asker.

5) The level value of the asker and the level values of the answerers are compared, and the closest answerer with a level value equal to or greater than the level value of the asker is selected.

In step S710, the information processing device 100 reports the question and the asker's attribution information to the extracted answerer.

In step S712, the information processing device 100 reports the discovery of an answerer to the asker.

Step S714 means that the processing from step S706 to step S712 is repeated.

Step S716 means that the processing from step S702 to step S714 is repeated.

Herein, the extraction of an answerer may also use a method other than the method given above. For example, a level value based on the question category and the per-category knowledge level of an answerer may be decided, and an answerer may be additionally selected according to a distance based on this level value.

Figure 8:
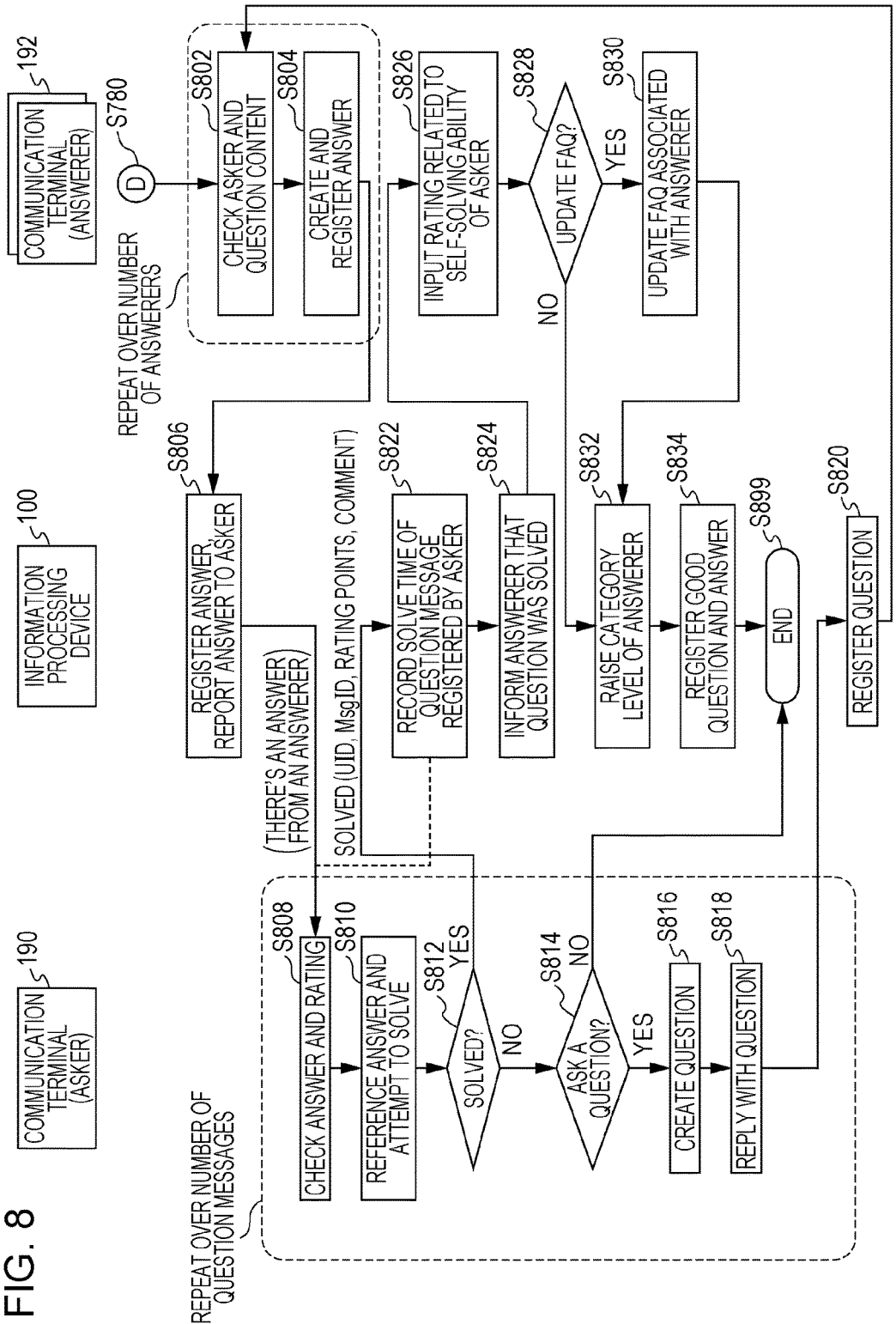
FIG. 8 is a flowchart illustrating an exemplary process according to an exemplary embodiment.

FIG. 8 is a flowchart illustrating an exemplary process according to the exemplary embodiment.

Figure 13:
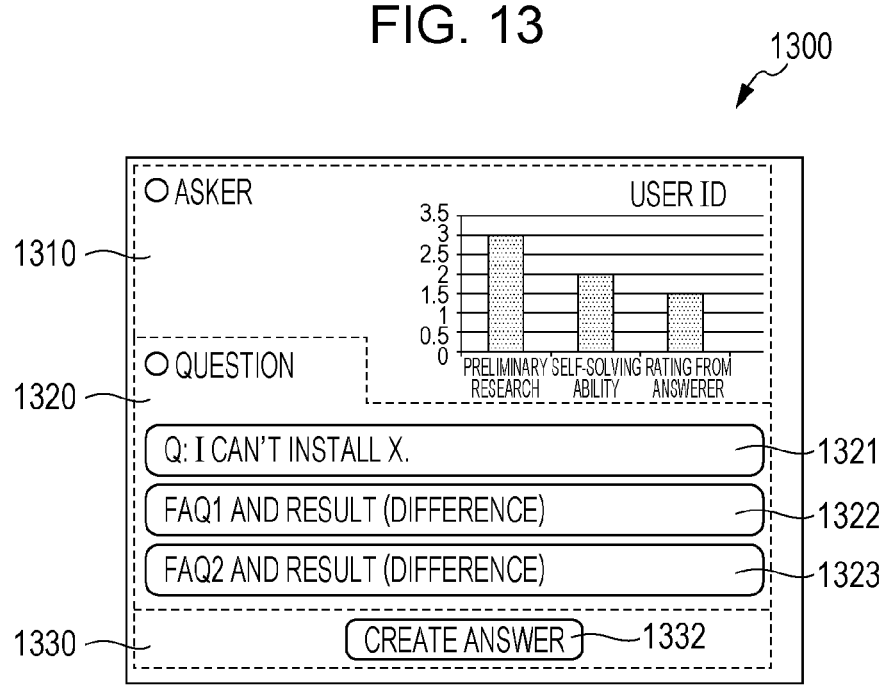
FIG. 13 is an explanatory diagram illustrating an example of a screen displaying a question reported to an answerer.

In step S802, the communication terminal (answerer) 192, according to an operation by the answerer, displays a report from the information processing device 100, enabling confirmation of the asker and the question content (see the screen 1300 displaying a question reported to an answerer illustrated by the example of FIG. 13).

Figure 14:
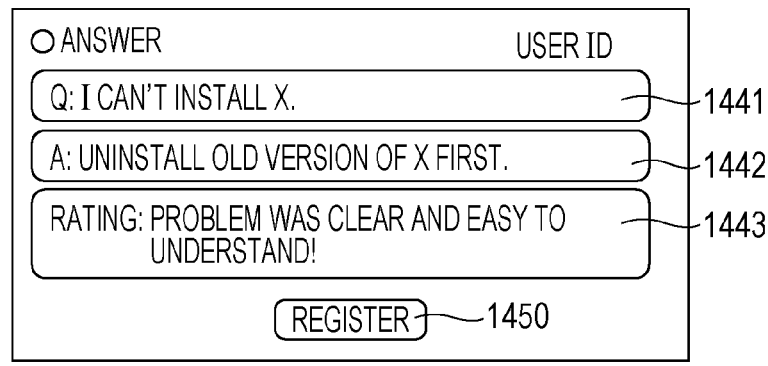
FIG. 14 is an explanatory diagram illustrating an example of an answer entry display screen.

In step S804, on the communication terminal (answerer) 192, the answerer creates a proposed solution, and presses the Register button 1450 (see the answer entry display screen 1400 illustrated by the example of FIG. 14).

In step S806, the information processing device 100 registers the received answer message in the message storage module 150 as the next message after the question message (see the message table 2700 illustrated by the example of FIG. 27), and reports the answer to the communication terminal (asker) 190. For example, a message such as "There's an answer from an answerer" is transmitted.

If the question information temporary storage module 125 is provided, the answer is reported to the current asker as well as users with the same category and urgency.

The processing from step S808 to step S818 is repeated a number of times equal to the number of question messages.

Figure 15:
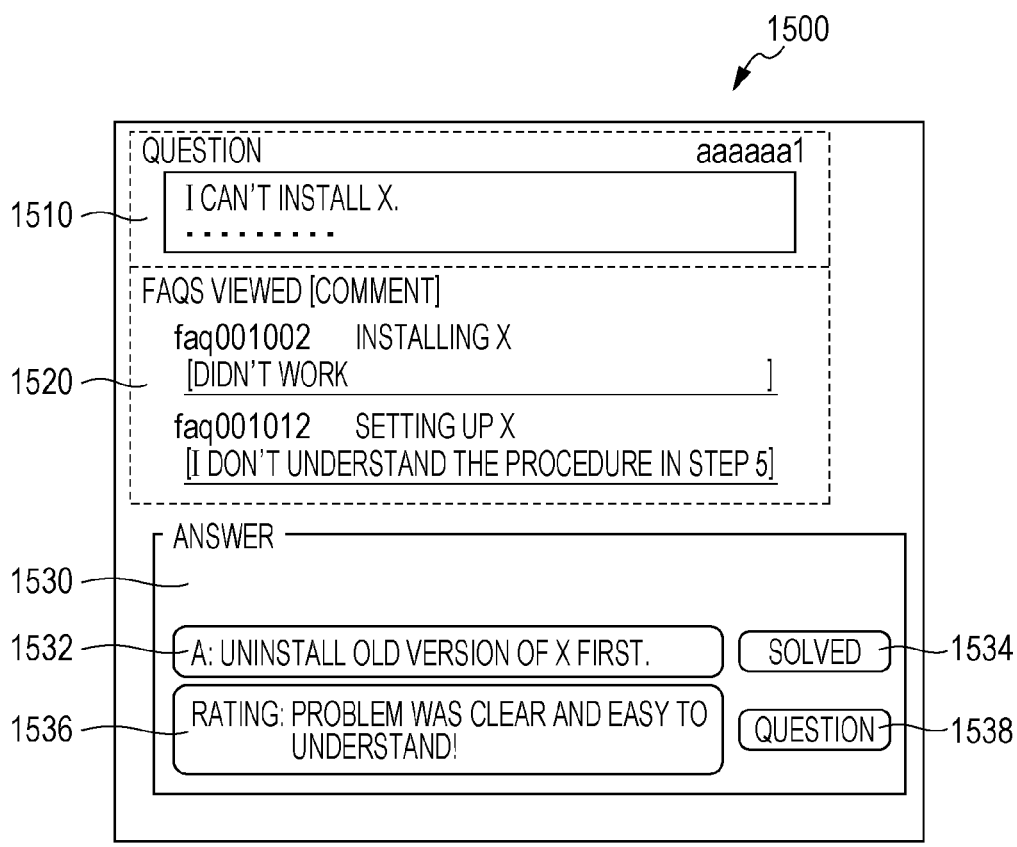
FIG. 15 is an explanatory diagram illustrating an example of an answer display screen.

In step S808, on the communication terminal (asker) 190, the asker who received the answer report checks the answer content and a feedback rating (see the answer display screen 1500 illustrated by the example of FIG. 15).

In step S810, on the communication terminal (asker) 190, the asker refers to the answer content, and attempts to solve the problem (see the answer display screen 1500 illustrated by the example of FIG. 15).

In step S812, the communication terminal (asker) 190, according to an operation by the asker, judges whether or not the problem is solved. If the problem is solved, the Solved button 1634 is pressed, and the solution is registered according to an operation by the asker (see the screen 1600 for a question about an answer (before registration) illustrated by the example of FIG. 16). At this point, the UID, message ID, self-solving ability, and effectiveness are passed to the information processing device 100. If the problem is not solved, the process proceeds to step S814.

In step S814, the communication terminal (asker) 190, according to an operation by the asker, judges whether or not to register a question in the information processing device 100. In the case of asking a question, the process proceeds to step S816, while in the case of not asking a question, the use of the information processing device 100 ends.

Figure 17:
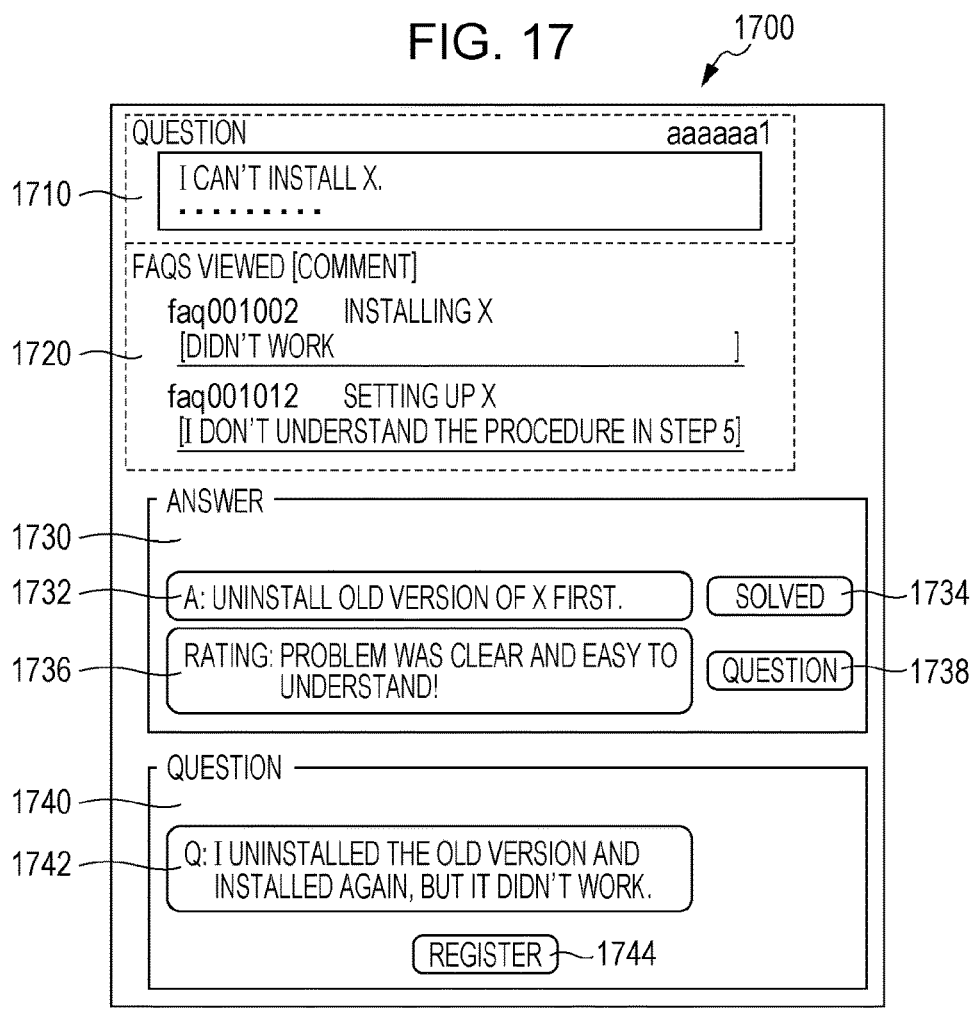
FIG. 17 is an explanatory diagram illustrating an example of a screen for a question about an answer (before registration)

In step S816, the communication terminal (asker) 190, according to an operation by the asker, displays a question screen if a Question button 1538 on the answer display screen 1500 illustrated by the example in FIG. 15 is pressed (see the screen 1700 for a question about an answer (before registration) illustrated by the example of FIG. 17). The asker inputs comments about the answer as appropriate, and presses the Register button 1744.

In step S818, the communication terminal (asker) 190 transmits the question message from the communication terminal (asker) 190 to the information processing device 100.

In step S820, the information processing device 100 registers the question message in the message storage module 150 as the next message after the answer message, and reports the message from the asker to the answerer. After that, the process proceeds to step S802.

In step S822, the information processing device 100 searches the message storage module 150 for a question message originating from the ID of the answer message, and records the solve time of the question message registered by the asker.

If the question information temporary storage module 125 is provided, the solving of the problem by the answer is reported to the current asker as well as users with the same category and urgency.

Furthermore, the unanswered list is checked, and if there are multiple questions in the same group, the original question and the answer message are registered as a proposed FAQ in the important discussion storage module 160, thereby enabling similar questions occurring later to be primarily answered as a FAQ.

In step S824, the information processing device 100 informs the answerer that the question was solved.

Figure 18:
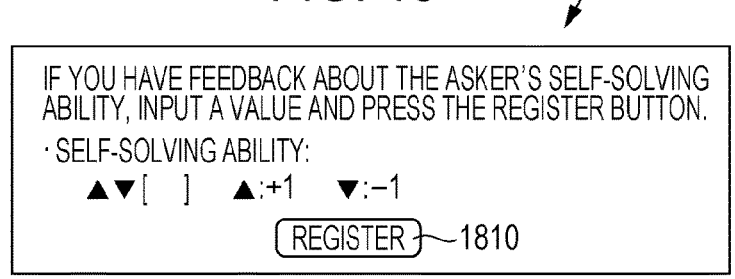
FIG. 18 is an explanatory diagram illustrating an example of a rating entry screen.

In step S826, the communication terminal (answerer) 192, according to an operation by the answerer, receives a rating related to the self-solving ability of the asker (see the rating entry screen 1800 illustrated by the example of FIG. 18).

Figure 19:
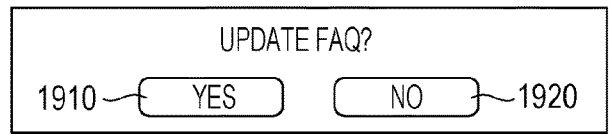
FIG. 19 is an explanatory diagram illustrating an example of a FAQ update confirmation screen.

In step S828, the communication terminal (answerer) 192, according to an operation by the answerer, judges whether or not to update a FAQ associated with that answerer (see the FAQ update confirmation screen 1900 illustrated by the example of FIG. 19). In the case of updating, a Yes button 1910 is pressed, and the process proceeds to step S830. In the case of not updating, a No button 1920 is pressed, and the process proceeds to step S832.

In step S830, the communication terminal (answerer) 192, according to an operation by the answerer, requests the information processing device 100 to update a FAQ associated with the answerer.

In step S832, the information processing device 100 raises the corresponding category level of the answerer. The process then ends.

In step S834, the information processing device 100 registers a question by a good asker (a user with a high preliminary research level and high self-solving ability) and the corresponding answer in the important discussion storage module 160.

FIG. 9 is an explanatory diagram illustrating an example of the search request and results screen 900. The search request and results screen 900 is displayed in steps S410 and S414 discussed earlier. On the search request and results screen 900, there are displayed a search area 910, a search results area 920, and a question area 930. The search area 910 includes a search query field 912. The search query field 912 receives a user's search query (question). The search results area 920 includes a Solved button 922 and a Solved button 924. The question area 930 includes a Create Question button 932. The results of conducting a search according to the search query field 912 are displayed in the search results area 920. If the question is solved by the search results, the Solved button 922 or the Solved button 924 is pressed. On the other hand, if the question is not solved even with the search results, the Creation Question button 932 is pressed.

Figure 10:
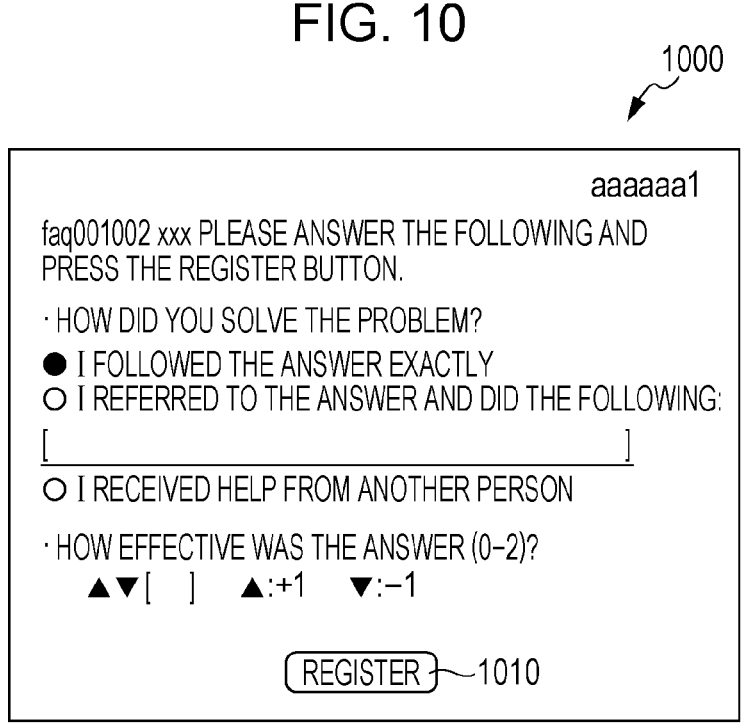
FIG. 10 is an explanatory diagram illustrating an example of a dialog box after pushing a Solved button.

FIG. 10 is an explanatory diagram illustrating an example of a dialog box 1000 after pushing a Solved button. The dialog box 1000 is displayed after pushing a Solved button displayed in step S414 discussed earlier. A Register button 1010 is displayed on the dialog box 1000 after pushing a Solved button. For example, the dialog box 1000 after pushing a Solved button is displayed when the Solved button 922 is pressed on the search request and results screen 900 illustrated by the example of FIG. 9. On the dialog box 1000 after pushing a Solved button, the following content is displayed, for example.

faq001002 xxx Please answer the following and press the Register button.
How did you solve the problem?
[X] I followed the answer exactly
[ ] I referred to the answer and did the following:
[ ]
[ ] I received help from another person
How effective was the answer (0-2)?
∧ ∨ [ ]  ∧: +1 point, ∨: −1 point Subsequently, when the Register button 1010 is pressed, the UID, FAQID, self-solving ability, and the answer effectiveness are passed to the information processing device 100.

FIG. 11 is an explanatory diagram illustrating an example of a created question (before registration) screen 1100. The created question (before registration) screen 1100 is displayed in step S426 discussed earlier. On the created question (before registration) screen 1100, there are displayed a question area 1110, a supplementary area 1120, and a registration area 1130. The question area 1110 includes a question field 1112. The question field 1112 receives a user's question. The content is similar to the search query received in the search query field 912. The text string received in the search query field 912 may also be copied into the question field 1112. The supplementary area 1120 receives comments about the search results. Subsequently, the Register button 1132 in the registration area 1130 is pressed by the user.

Figure 12:
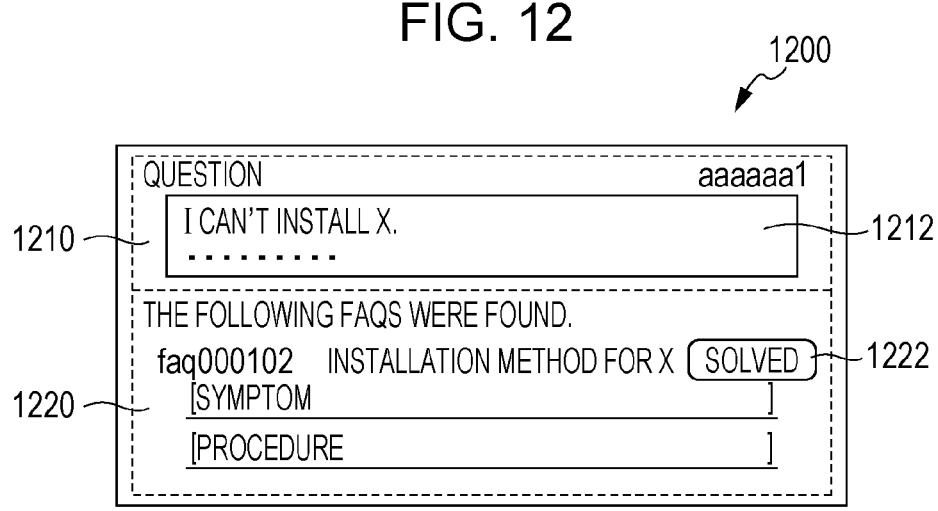
FIG. 12 is an explanatory diagram illustrating an example of a solved question and answer message reply screen.

FIG. 12 is an explanatory diagram illustrating an example of a solved question and answer message reply screen 1200. The solved question and answer message reply screen 1200 is displayed in step S412 discussed earlier. On the solved question and answer message reply screen 1200, there are displayed a question area 1210 and a search results area 1220. The question area 1210 includes a question field 1212. A search query input by the user is displayed in the question field 1212. The search results area 1220 includes a Solved button 1222. In the search results area 1220, there is displayed the page content at the URL of a FAQ clicked on the search request and results screen 900 discussed earlier. If the question content is solved with this content, the Solved button 1222 is pressed.

FIG. 13 is an explanatory diagram illustrating an example of a screen 1300 displaying a question reported to an answerer. The screen 1300 displaying a question reported to an answerer is displayed in step S802 discussed earlier. On the screen 1300 displaying a question reported to an answerer, there is displayed an asker data presentation area 1310, a question area 1320, and an answer area 1330. On the screen 1300 displaying a question reported to an answerer, there is displayed a graph of the asker's attributes (herein, the preliminary research level, self-solving ability, rating by past answerers, and the like). The question area 1320 includes a question field 1321 displaying the question content, a supplementary field 1322, and a supplementary field 1323. These fields correspond to the content in the created question (before registration) screen 1100 illustrated by the example of FIG. 11. The answer area 1330 includes a Create Answer button 1332. The Create Answer button 1332 is pressed when answering the question.

FIG. 14 is an explanatory diagram illustrating an example of the answer entry display screen 1400. The answer entry display screen 1400 is displayed in step S804 discussed earlier. The answer entry display screen 1400 includes a question field 1441, an answer field 1442, and a rating field 1443. The question from the asker is displayed in the question field 1441. The answer field 1442 receives the answer from the answerer. The rating field 1443 receives a rating of the question by the answerer.

FIG. 15 is an explanatory diagram illustrating an example of the answer display screen 1500. The answer display screen 1500 is displayed in step S808 discussed earlier. The answer display screen 1500 displays a question area 1510, a supplementary area 1520, and an answer area 1530. In the question area 1510 and the supplementary area 1520, the question and the like from the asker are displayed. These areas correspond to the content in the created question (before registration) screen 1100 illustrated by the example of FIG. 11. The answer area 1530 includes an answer display area 1532, a Solved button 1534, a rating display area 1536, and a Question button 1538. The answer display area 1532 and the rating display area 1536 display the answer and the like from the answerer. These areas correspond to the content in the answer entry display screen 1400 illustrated by the example of FIG. 14. If the problem is solved by the answer, the Solved button 1534 is pressed, whereas if the asker has an additional question, the Question button 1538 is pressed.

Figure 16:
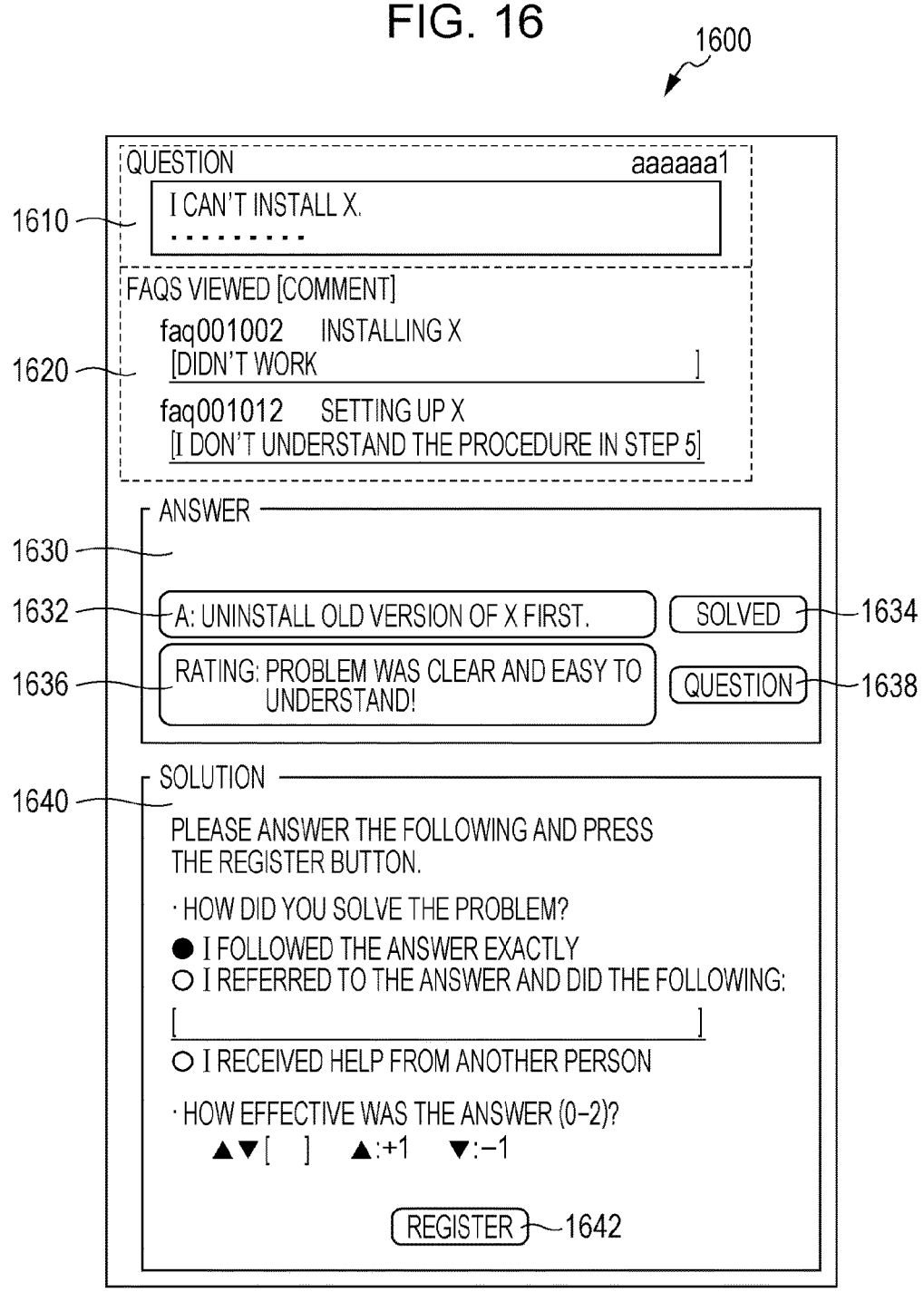
FIG. 16 is an explanatory diagram illustrating an example of a screen for a question about an answer (before registration)

FIG. 16 is an explanatory diagram illustrating an example of a screen 1600 for a question about an answer (before registration). The screen 1600 for a question about an answer (before registration) is displayed in step S812 discussed earlier. The screen 1600 for a question about an answer (before registration) is displayed when the Solved button 1534 is pressed on the answer display screen 1500 illustrated by the example of FIG. 15. On the screen 1600 for a question about an answer (before registration), there are displayed a question area 1610, a supplementary area 1620, an answer area 1630, and a solution area 1640. The answer area 1630 includes an answer display area 1632, a Solved button 1634, a rating display area 1636, and a Question button 1638. The question area 1610, the supplementary area 1620, and the answer area 1630 correspond to the question area 1510, the supplementary area 1520, and the answer area 1530 on the answer display screen 1500, respectively. The solution area 1640 includes a Register button 1642. The content in the solution area 1640 is similar to the content on the dialog box 1000 after pushing a Solved button illustrated by the example of FIG. 10, but in the solution area 1640, a rating is given in response to the current answer to the question, rather than a past answer (FAQ).

FIG. 17 is an explanatory diagram illustrating an example of a screen 1700 for a question about an answer (before registration). The screen 1700 for a question about an answer (before registration) is displayed in step S816 discussed earlier. The screen 1700 for a question about an answer (before registration) is displayed when the Question button 1538 is pressed on the answer display screen 1500 illustrated by the example of FIG. 15. On the screen 1700 for a question about an answer (before registration), there are displayed a question area 1710, a supplementary area 1720, an answer area 1730, and a question area 1740. The answer area 1730 includes an answer display area 1732, a Solved button 1734, a rating display area 1736, and a Question button 1738. The question area 1710, the supplementary area 1720, and the answer area 1730 correspond to the question area 1510, the supplementary area 1520, and the answer area 1530 on the answer display screen 1500, respectively. The question area 1740 includes a question entry area 1742 and a Register button 1744. The question entry area 1742 receives an additional question from the asker. After the entry of the question is finished, the Register button 1744 is pressed.

FIG. 18 is an explanatory diagram illustrating an example of the rating entry screen 1800. The rating entry screen 1800 is displayed in step S826 discussed earlier. On the rating entry screen 1800, the answerer rates the asker. The rating entry screen 1800 includes a Register button 1810. After the entry of the rating is finished, the Register button 1810 is pressed.

FIG. 19 is an explanatory diagram illustrating an example of a FAQ update confirmation screen 1900. The FAQ update confirmation screen 1900 is displayed in step S828 discussed earlier. The FAQ update confirmation screen 1900 is for judging whether or not to update a FAQ associated with the answerer, and includes a Yes button 1910 and a No button 1920. In the case of updating, the Yes button 1910 is pressed, while in the case of not updating, the No button 1920 is pressed.

Figure 20:
FIG. 20 is an explanatory diagram illustrating an exemplary data structure of a basic information table.

FIG. 20 is an explanatory diagram illustrating an exemplary data structure of a basic information table 2000. The basic information table 2000 is processed by the user information registration/update module 135, and stored in the user information storage module 140. The basic information table 2000 includes a user ID field 2010, a name field 2020, an email address field 2030, a department field 2040, a reference to category field 2050, a last update time field 2060, a question list field 2070, an answer list field 2080, and a self-solving ability field 2090. The user ID field 2010 stores information (a user identification (ID)) for uniquely identifying a user (a person who may become an asker or an answerer candidate). The name field 2020 stores the name of the user. The email address field 2030 stores the email address of the user. The department field 2040 stores the department of the user. The reference to category field 2050 stores a reference to the category (field of knowledge) of the user. The last update time field 2060 stores the last update time for the current row in the basic information table 2000. The time may be the year, month, day, hour, minute, second, fraction of a second, or some combination thereof. The question list field 2070 stores a pointer to a question list indicating questions asked by the user or answered questions. The answer list field 2080 stores a pointer to an answer list of answers to questions asked by the user. The self-solving ability field 2090 stores the self-solving ability of the user.

FIG. 21 is an explanatory diagram illustrating an exemplary data structure of a question list 2100 referenced by aaaaaa1-1. The question list 2100 referenced by aaaaaa1-1 is stored in the user information storage module 140. The question list 2100 referenced by aaaaaa1-1 is a list indicated by the question list field 2070 of the basic information table 2000. The question list 2100 referenced by aaaaaa1-1 includes a No. field 2110 and a message ID field 2120. The No. field 2110 stores the number (No.) of a question in the list. The message ID field 2120 stores information (a message ID) for uniquely identifying a message in the present exemplary embodiment. The question list 2100 referenced by aaaaaa1-1 illustrated by the example of FIG. 21 is the question list for "Tanaka".

FIG. 22 is an explanatory diagram illustrating an exemplary data structure of an answer list 2200 referenced by cccccc5-3. The answer list 2200 referenced by cccccc5-3 is stored in the user information storage module 140. The answer list 2200 referenced by cccccc5-3 is a list indicated by the answer list field 2080 of the basic information table 2000. The answer list 2200 referenced by cccccc5-3 includes a No. field 2210 and a message ID field 2220. The No. field 2210 stores the number (No.) of an answer in the list. The message ID field 2220 stores a message ID. The answer list 2200 referenced by cccccc5-3 illustrated by the example of FIG. 22 is the answer list for "Satou".

FIG. 23 is an explanatory diagram illustrating an exemplary data structure of an aaaaaa1 knowledge level table 2300. FIG. 24 is an explanatory diagram illustrating an exemplary data structure of a cccccc5 knowledge level table 2400. FIG. 25 is an explanatory diagram illustrating an exemplary data structure of a cccccc5 knowledge level table 2500. FIG. 26 is an explanatory diagram illustrating an exemplary data structure of a dddddd71 knowledge level table 2600. The aaaaaa1 knowledge level table 2300, the cccccc5 knowledge level table 2400, the cccccc5 knowledge level table 2500, and the dddddd71 knowledge level table 2600 are stored in the user information storage module 140. The aaaaaa1 knowledge level table 2300 includes a category field 2310 and a knowledge level 2320. The category field 2310 stores a category. The knowledge level 2320 stores the knowledge level for that category. The cccccc5 knowledge level table 2400, the cccccc5 knowledge level table 2500, and the dddddd71 knowledge level table 2600 also have similar data structures. The aaaaaa1 knowledge level table 2300 stores the per-category knowledge levels for "Tanaka". The cccccc5 knowledge level table 2400 stores the per-category knowledge levels for "Suzuki". The cccccc5 knowledge level table 2500 stores the per-category knowledge levels for "Satou". The dddddd71 knowledge level table 2600 stores the per-category knowledge levels for "Fuji".

FIG. 27 is an explanatory diagram illustrating an exemplary data structure of the message table 2700. The message table 2700 is used in step S502, and is stored in the message storage module 150. The message table 2700 includes a message ID field 2705, a registrant ID field 2710, a registration time field 2715, registered content 2720, a type field 2725, a status field 2730, a solve time field 2735, a previous message ID field 2740, a next message ID field 2745, a faqID field 2750, and a category field 2755. The message ID field 2705 stores the message ID of a question or an answer. The registrant ID field 2710 stores information (a registrant ID) for uniquely identifying a registrant (user) in the present exemplary embodiment. The registration time field 2715 stores the registration time of the message. The registered content 2720 stores the registered content of the message. The type field 2725 stores the type (question or answer) of the message. The status field 2730 stores the status (such as solved or ongoing) of the message. The solve time field 2735 stores the solve time for the message. The previous message ID field 2740 stores the previous message ID before the current message (for example, if the current message is an answer, the previous message is typically a question message). The next message ID field 2745 stores the next message ID after the current message (for example, if the current message is a question, the next message is typically an answer message). The faqID field 2750 stores information (a faqID) for uniquely identifying a FAQ corresponding to the message in the present exemplary embodiment. The category field 2755 stores the category of the message.

Figure 28:
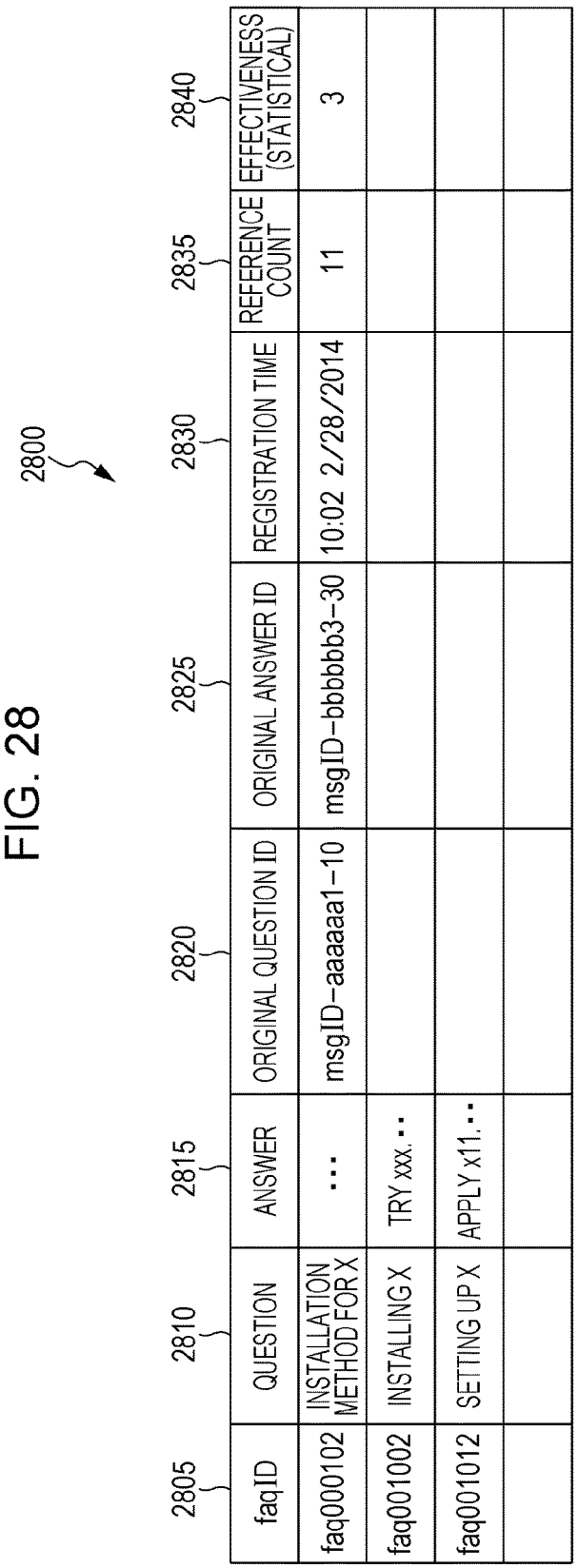
FIG. 28 is an explanatory diagram illustrating an exemplary data structure of an important discussion table.

FIG. 28 is an explanatory diagram illustrating an exemplary data structure of an important discussion table 2800. The important discussion table 2800 is processed by the search module 155, and is stored in the important discussion storage module 160. The important discussion table 2800 includes a faqID field 2805, a question field 2810, an answer field 2815, an original question ID field 2820, an original answer ID field 2825, a registration time field 2830, a reference count field 2835, and an effectiveness (statistical) field 2840. The faqIQ field 2805 stores the faqID of a FAQ. This faqID is indicated by the faqID field 2750 of the message table 2700. The question field 2810 stores the question in that FAQ. The answer field 2815 stores the answer in that FAQ. The original question ID field 2820 stores the original question ID. The original answer ID field 2825 stores the original answer ID. The registration time field 2830 stores the registration time of the FAQ. The reference count field 2835 stores the number of times the FAQ has been referenced. Initially, the reference count is 0. The effectiveness (statistical) field 2840 stores the effectiveness of the FAQ (expressed as a statistical value). Herein, the statistical value may be a value such as the mean, median, or mode of the rating for that FAQ.

FIG. 29 is an explanatory diagram illustrating an exemplary data structure of the important discussion or message reference history table 2900. The important discussion or message reference history table 2900 is used in step S416, and is stored in the message storage module 150 (or the important discussion storage module 160). The important discussion or message reference history table 2900 includes a No. field 2905, a faqID field 2910, a session ID field 2915, a reference time field 2920, a solve time 2925, a self-solving field 2930, and an effectiveness field 2935. The No. field 2905 stores the number (No.) of the reference history. The faqID field 2910 stores the faqID of the referenced FAQ. The session ID field 2915 stores the session ID in the FAQ reference. The reference time field 2920 stores the time when the FAQ was referenced. The solve time 2925 stores the time when a problem was solved by the FAQ. The self-solving field 2930 stores the degree of self-solving using the FAQ. In the self-solving field 2930, an empty field means "unsolved", a value of "1" means "solved with support", a value of "2" means "solved exactly according to answer", and a value of "3" means "self-solved with a supplement to the answer". The effectiveness field 2935 stores the effectiveness. In the effectiveness field 2935, an empty field means "not particularly effective", a value of "1" means "supplementary information is desirable", a value of "2" means "helpful", and a value of "3" means "very helpful". For example, the first row of the important discussion or message reference history table 2900 means that a user referenced faq000012, solved the problem with support, and rated the FAQ as "very helpful". Note that the entire important discussion or message reference history table 2900 illustrated by the example of FIG. 29 illustrates the reference history for Tanaka.

FIG. 30 is an explanatory diagram illustrating an exemplary data structure of the important discussion or message reference history table 3000. The important discussion or message reference history table 3000 is used in step S408, and is stored in the message storage module 150 (or the important discussion storage module 160). The important discussion or message reference history table 3000 has a similar data structure as the important discussion or message reference history table 2900 illustrated by the example of FIG. 29.

FIGS. 31A to 31C are explanatory diagrams illustrating an exemplary data structure of a search history table 3100. The search history table 3100, answer table 3140, and answer table 3150 are processed by the message registration/ update module 145 and the search module 155, and are stored in the message storage module 150. FIG. 31A is an explanatory diagram illustrating an exemplary data structure of the search history table 3100. The search history table 3100 includes a No. field 3105, a user ID field 3110, a search time field 3115, a search parameter field 3120, and a faqID list field 3130. The No. field 3105 stores the number (No.) of the search. The user ID field 3110 stores the user ID of the user who conducted the search. The search time field 3115 stores the search time when the search was conducted. The search parameter field 3120 stores the search parameter of the search. The faqID list field 3130 stores a faqID list as a search result. For example, the faqID list field 3130 stores a pointer to the answer table 3140 or the answer table 3150. Specifically, the first row of the search history table 3100 stores a pointer to the answer table 3140, while the second row of the search history table 3100 stores a pointer to the answer table 3150. FIG. 31B is an explanatory diagram illustrating an exemplary data structure of the answer table 3140. The answer table 3140 includes a faqID field 3142 and an answer field 3144. The faqID field 3142 stores the faqID of a FAQ as a search result. The answer field 3144 stores the answer portion of the content of that FAQ. FIG. 31C is an explanatory diagram illustrating an exemplary data structure of the answer table 3150. The answer table 3150 has a similar data structure as the answer table 3140.

FIGS. 32A and 32B are explanatory diagrams illustrating an exemplary data structure of the unanswered table 3200. The unanswered table 3200 is used in step S608. The unanswered table 3200 and the asker level table 3250 are stored in the question information temporary storage module 125. FIG. 32A is an explanatory diagram illustrating an exemplary data structure of the unanswered table 3200. The unanswered table 3200 includes a category field 3210 and an urgency field 3220. The category field 3210 stores the category. The urgency field 3220 stores the urgency. A list pointed from a cell of the unanswered table 3200 (a cell at an intersection between the category field 3210 and the urgency field 3220) is like the asker level table 3250, for example.

FIG. 32B is an explanatory diagram illustrating an exemplary data structure of the asker level table 3250. The asker level table 3250 includes an asker level field 3252 and a pointer field 3254. The asker level field 3252 stores the asker level. The pointer field 3254 stores a pointer. The asker level is defined in three stages, for example.

FIG. 33 is an explanatory diagram illustrating an exemplary data structure of the category determination table 3300. The category determination table 3300 is used in step S604. The category determination table 3300 includes a No. field 3310, a category field 3320, and a keywords field 3330. The No. field 3310 stores the number (No.) of the category. The category field 3320 stores the category. The keywords field 3330 stores keywords for that category. A message or the like that includes a keyword is categorized into the category corresponding to that keyword.

FIG. 34 is an explanatory diagram illustrating an exemplary data structure of the urgency determination table 3400. The urgency determination table 3400 is used in step S606. The urgency determination table 3400 includes an expression pattern field 3410 and an urgency field 3420. The expression pattern field 3410 stores an expression pattern, such as a regular expression. The urgency field 3420 stores an urgency corresponding to that expression pattern.

FIGS. 35A to 35D are explanatory diagrams illustrating an exemplary data structure of the unanswered table 3500. The unanswered table 3500 is used in step S610, and is stored in the question information temporary storage module 125. FIG. 35A is an explanatory diagram illustrating an exemplary data structure of the unanswered table 3500. The unanswered table 3500 includes a category field 3510 and an urgency field 3520. The category field 3510 stores the category. The urgency field 3520 stores the urgency. A cell at the intersection stores a pointer to the asker level table 3550. FIG. 35B is an explanatory diagram illustrating an exemplary data structure of the asker level table 3550. The asker level table 3550 includes an asker level field 3552 and a pointer field 3554. The asker level field 3552 stores the asker level. The pointer field 3554 stores a pointer to a message (question) table 3560. FIG. 35C is an explanatory diagram illustrating an exemplary data structure of the message (question) table 3560. The message (question) table 3560 includes a message (question) field 3562 and a pointer field 3564. The message (question) field 3562 stores the message ID of a question asked by the corresponding asker. The pointer field 3564 stores a pointer to a message (question) table 3570. FIG. 35D is an explanatory diagram illustrating an exemplary data structure of the message (question) table 3570. The message (question) table 3570 includes a message (question) field 3572 and a pointer field 3574. The message (question) field 3572 stores the message ID of a question asked by the corresponding asker. The pointer field 3574 stores a pointer. A question message is added to the list corresponding to the asker level. If a message already exists at that asker level, the question message is inserted at the end of the pointer.

FIG. 36 is an explanatory diagram illustrating an exemplary data structure of a message/keyword (KW) vector representation table 3600. The message/keyword (KW) vector representation table 3600 is used in step S708. The message/keyword (KW) vector representation table 3600 includes a message ID field 3610, a KW1 field 3621, a KW2 field 3622, a KW3 field 3623, a KW4 field 3624, a KW5 field 3625, a KW6 field 3626, a KW7 field 3627, a KW8 field 3628, a KW9 field 3629, and so on. The message ID field 3610 stores a message ID. The KW1 field 3621 stores the presence or absence of KW1 in that message. The KW2 field 3622 and subsequent fields similarly store the presence or absence of KW2 and so on. In other words, a vector is formed whose elements are the KWn of that message.

FIG. 37 is an explanatory diagram illustrating an exemplary data structure of a user/category name (CN) vector representation table 3700. The user/category name (CN) vector representation table 3700 is used in step S708. The user/category name (CN) vector representation table 3700 includes a user ID field 3710, a CN1 field 3721, a CN2 field 3722, a CN3 field 3723, a CN4 field 3724, a CN5 field 3725, a CN6 field 3726, a CN7 field 3727, a CN8 field 3728, a CN9 field 3729, and so on. The user ID field 3710 stores a user ID. The CN1 field 3721 stores the presence or absence of CN1 for that user. The CN2 field 3722 and subsequent fields similarly store the presence or absence of CN2 and so on. In other words, a vector is formed whose elements are the CNn for that user.

Figure 38:
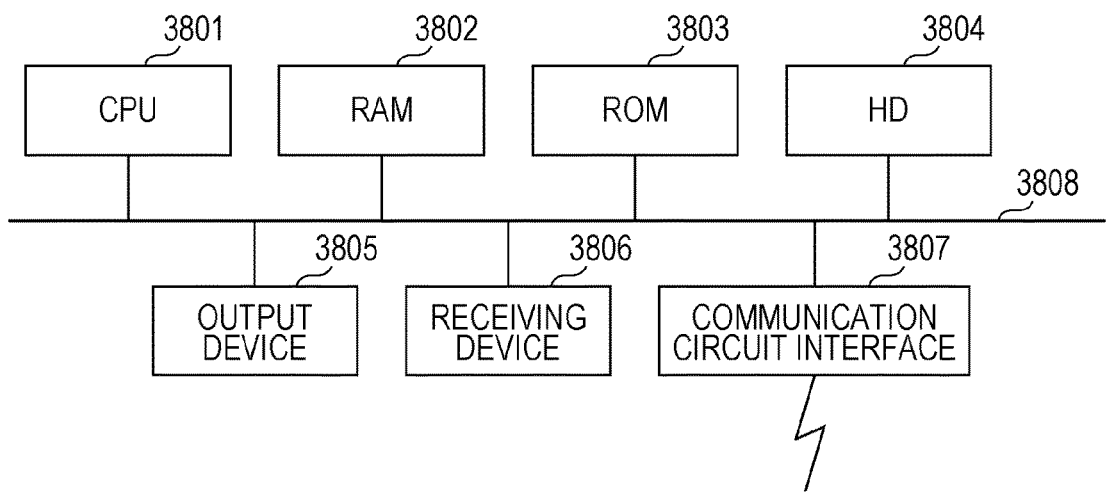
FIG. 38 is a block diagram illustrating an exemplary hardware configuration of a computer that realizes an exemplary embodiment.

Note that a hardware configuration of a computer executing a program that acts as the present exemplary embodiment is a general computer as illustrated by the example of FIG. 38, and specifically is a computer or the like that may be a personal computer or a server. In other words, as a specific example, a CPU 3801 is used as a processing unit (computational unit), while RAM 3802, ROM 3803, and an HD 3804 are used as storage devices. For the HD 3804, a hard disk may be used, for example. The computer is made up of the CPU 3801 that executes programs such as the communication process module 105, the analysis module 110, the response generation module 115, the matching process module 120, the control module 130, the user information registration/update module 135, the message registration/update module 145, and the search module 155, the RAM 3802 that stores such programs and data, the ROM 3803 that stores programs and the like for activating the computer, the HD 3804 which is an auxiliary storage device (and may also be flash memory or the like) that may function as the question information temporary storage module 125, the user information storage module 140, the message storage module 150, and important discussion storage module 160, and the like, a receiving device 3806 that receives data on the basis of operations performed by a user with device such as a keyboard, mouse, or touch panel, an image output device 3805 such as a CRT or liquid crystal display, a communication link interface 3807 such as a network interface card for connecting to a communication network, and a bus 3808 for joining and exchanging data with the above components. Multiple such computers may also be connected to each other by a network.

Of the foregoing exemplary embodiments, for those made up of a computer program, software in the form of a computer program is made to be read into a system with the above hardware configuration, and the foregoing exemplary embodiments are realized by the cooperative action of the software and hardware resources.

Note that the hardware configuration illustrated in FIG. 38 illustrates a single exemplary configuration, and that the exemplary embodiments are not limited to the configuration illustrated in FIG. 38 insofar as the configuration still enables execution of the modules described in the exemplary embodiments. For example, some modules may also be realized with special-purpose hardware (such as an ASIC, for example), and some modules may be configured to reside within an external system and be connected via a communication link. Furthermore, it may also be configured such that multiple instances of the system illustrated in FIG. 38 are connected to each other by a communication link and operate in conjunction with each other. Additionally, besides a personal computer in particular, an exemplary embodiment may also be incorporated into a device such as an information appliance, photocopier, fax machine, scanner, printer, or multi-function device (that is, an image processing device having two or more from among scanning, printing, copying, and faxing functions).

Note that the described program may be provided stored in a recording medium, but the program may also be provided via a communication medium. In this case, a computer-readable recording medium storing a program, for example, may also be taken to be an exemplary embodiment of the present invention with respect to the described program.

A "computer-readable recording medium storing a program" refers to a computer-readable recording medium upon which a program is recorded, and which is used in order to install, execute, and distribute the program, for example.

Potential examples of a recording medium include a Digital Versatile Disc (DVD), encompassing formats such as DVD-R, DVD-RW, and DVD-RAM defined by the DVD Forum and formats such as DVD+R and DVD+RW defined by DVD+RW Alliance, a compact disc (CD), encompassing formats such as read-only memory (CD-ROM), CD Recordable (CD-R), and CD Rewritable (CD-RW), a Blu-ray Disc (registered trademark), a magneto-optical (MO) disc, a flexible disk (FD), magnetic tape, a hard disk, read-only memory (ROM), electrically erasable and programmable read-only memory (EEPROM (registered trademark)), flash memory, random access memory (RAM), and a Secure Digital (SD) memory card.

In addition, all or part of the above program may also be recorded to the recording medium and saved or distributed, for example. Also, all or part of the above program may be communicated by being transmitted using a transmission medium such as a wired or wireless communication network used in a local area network (LAN), a metropolitan area network (MAN), a wide area network (WAN), an internet, an intranet, an extranet, or some combination thereof, or alternatively, by being impressed onto a carrier wave and propagated.

Furthermore, the above program may be part of another program, and may also be recorded to a recording medium together with other separate programs. The above program may also be recorded in a split manner across multiple recording media. The above program may also be recorded in a compressed, encrypted, or any other recoverable form.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An answerer extraction system comprising:
one or more processors configured to implement:
a receiving unit that receives a question from an asker;
a recording unit that records a reference history of the asker's referencing past questions or answers; and
an extraction unit that extracts an answerer who is to answer the question on a basis of the reference history of the asker,
wherein the extraction unit further extracts the answerer and thereby interfaces a terminal device of the asker to a terminal device of the answerer based on the extraction unit determining a match between attributes of the answerer and a degree indicated by the reference history of the asker, the degree indicating a history of the asker solving questions presented by the asker without using an extracted answerer to solve the questions, and
wherein the one or more processors are further configured to implement extracting the answerer by, in response to determining that a plurality of values exist in an unanswered question table comprising a plurality of cells:
determining an urgency of each of the cells of the unanswered question table; and
looping the following in an order of the urgency of each of the cells:
checking whether one of the cells contains a pointer to an unanswered list;
in response to determining that the one of the cells contains the pointer, looping the following from the unanswered list:
dividing a plurality of second questions and the question by word structures by calculating distances from the question to past second questions by comparing vectors of keywords between the question and the second questions;

storing answerers, including the answerer, of ones of the second questions, corresponding to ones of the distances greater than a predetermined threshold;

calculating an asker level value by a first predetermined formula;

calculating a plurality of answerer level values, respective to ones of the answerers, by a second predetermined formula;

sorting the answerers by vector distances between the asker level value and the ones of the answerer level values;

extracting the answerer in response to determining that a smallest of the vector distances is respective to the answerer.

2. The answerer extraction system according to claim 1, wherein the one or more processors are further configured to implement: a search unit that searches past questions or answers for an answer to the question received by the receiving unit; and an answer candidate proposal unit that proposes a search result from the search unit as an answer candidate to the question received by the receiving unit.

3. The answerer extraction system according to claim 1, wherein the one or more processors are further configured to implement:

a temporary storage unit that temporarily stores a plurality of questions received by the receiving unit before an answerer is extracted; and a grouping unit that groups the plurality of questions stored in the temporary storage unit according to content;

wherein the extraction unit extracts one answerer for the grouped plurality of questions.

4. The answerer extraction system according to claim 1, wherein the degree being adjusted by the extraction unit according to a number of searches performed by the asker regarding the question.

5. The answerer extraction system according to claim 4, wherein the extraction unit further extracts the answerer from among a plurality of answerers by determining that the plurality of answerers and the answerer comprise attributes matching attributes of the question and that the answerer comprises an attribute matching a level of the question.

6. The answerer extraction system according to claim 1, wherein the extraction unit further extracts the answerer from among a plurality of answerers by determining that the plurality of answerers and the answerer comprise attributes matching the question and that the answerer comprises an attribute matching a rating of the question.

7. The answerer extraction system according to claim 1, wherein the reference history of the asker's referencing past questions or answers comprises the asker's referencing past questions or answers regarding the question, and wherein the extraction unit extracts the answerer from among a plurality of answerers by matching attributes of the answerer to attributes of the asker updated according to a combination of the question and the reference history of the asker.

8. The answerer extraction system according to claim 7, wherein the attributes of the asker are adjusted by the recording unit according to a rating provided by the answerer in response to providing an answer to the question.

9. The answerer extraction system according to claim 8, wherein the attributes of the answerer are adjusted by the recording unit according to a ranking provided by the asker in response to viewing the answer provided by the asker.

10. The answerer extraction system according to claim 1, wherein the degree further indicates an amount of time spent by the asker for attempting to answer the question, and the degree further indicates a self-solving ability of the asker which is updated by the answerer after answering the question.

11. The answerer extraction system according to claim 10, wherein the self-solving ability of the asker is graphically displayed to the answerer before answering the question.

12. The answerer extraction system according to claim 1, wherein the one or more processors are further configured to implement extracting the answerer by referencing a first data structure and a second data structure, the first data structure comprises a first linked list comprising the unanswered question table comprising a category field pointing to an asker level table comprising a asker level field pointing to a first message table comprising a message field pointing to a second message table comprising a field indicating a message identifier of the question, and the second data structure comprises a keyword vector representation table comprising the keyword vector distances.

13. An answerer extraction system comprising:

one or more processors configured to implement:

a receiving unit that receives a question from an asker;

a recording unit that records a reference history of the asker's referencing past questions or answers;

a computing unit that computes, from the reference history of the asker, the asker's ability to solve a problem;

a storage unit that controls storing knowledge information of answerer candidates; and an extraction unit that extracts an answerer who is to answer the question by using the computed ability and the stored knowledge information of the answerer candidates, wherein the extraction unit further extracts the answerer and thereby interfaces a terminal device of the asker to a terminal device of the answerer based on the extraction unit determining a match between attributes of the answerer and a degree indicated by the reference history of the asker, the degree indicating a history of the asker solving questions presented by the asker without using an extracted answerer to solve the questions, and wherein the one or more processors are further configured to implement extracting the answerer by, in response to determining that a plurality of values exist in an unanswered question table comprising a plurality of cells:

determining an urgency of each of the cells of the unanswered question table; and looping the following in an order of the urgency of each of the cells:

checking whether one of the cells contains a pointer to an unanswered list;

in response to determining that the one of the cells contains the pointer, looping the following from the unanswered list:

dividing a plurality of second questions and the question by word structures by calculating distances from the question to past second questions by comparing vectors of keywords between the question and the second questions;

storing answerers, including the answerer, of ones of the second questions, corresponding to ones of the distances greater than a predetermined threshold;

calculating an asker level value by a first predetermined formula;
calculating a plurality of answerer level values, respective to ones of the answerers, by a second predetermined formula;
sorting the answerers by vector distances between the asker level value and the ones of the answerer level values;
extracting the answerer in response to determining that a smallest of the vector distances is respective to the answerer.

14. The answerer extraction system according to claim 13, wherein the one or more processors are further configured to implement:
a control unit configured to, if the computed asker's ability is equal to or greater than a predetermined threshold value, control an important discussion storage unit to store at least one of the question and an answer to the question.

15. An answerer extraction system comprising:
one or more processors configured to implement:
a receiving unit that receives a question from an asker;
a recording unit that records a reference history of the asker's referencing past questions or answers;
a computing unit that computes, from the reference history of the asker, a degree that indicates how much the asker has researched before the question is received;
a storage unit that controls storing knowledge information of answerer candidates; and
an extraction unit that extracts an answerer who is to answer the question by using the computed degree and the knowledge information of the answerer candidates,
wherein the extraction unit further extracts the answerer and thereby interfaces a terminal device of the asker to a terminal device of the answerer based on the extraction unit determining a match between attributes of the answerer and the degree indicated by the reference history of the asker, the degree indicating a history of the asker solving questions presented by the asker without using an extracted answerer to solve the questions, and
wherein the one or more processors are further configured to implement extracting the answerer by, in response to determining that a plurality of values exist in an unanswered question table comprising a plurality of cells:
determining an urgency of each of the cells of the unanswered question table; and
looping the following in an order of the urgency of each of the cells:
checking whether one of the cells contains a pointer to an unanswered list;
in response to determining that the one of the cells contains the pointer, looping the following from the unanswered list:
dividing a plurality of second questions and the question by word structures by calculating distances from the question to past second questions by comparing vectors of keywords between the question and the second questions;
storing answerers, including the answerer, of ones of the second questions, corresponding to ones of the distances greater than a predetermined threshold;
calculating an asker level value by a first predetermined formula;
calculating a plurality of answerer level values, respective to ones of the answerers, by a second predetermined formula;
sorting the answerers by vector distances between the asker level value and the ones of the answerer level values;
extracting the answerer in response to determining that a smallest of the vector distances is respective to the answerer.

16. The answerer extraction system according to claim 15, wherein the one or more processors are further configured to implement:
a control unit configured to, if the computed degree is equal to or greater than a predetermined threshold value, control an important discussion storage unit to store at least one of the question and an answer to the question.

17. An answerer extraction system comprising:
one or more processors configured to implement:
a receiving unit that receives a question from an asker;
a recording unit that records a reference history of the asker's referencing past questions or answers;
a computing unit that computes, from the reference history of the asker, the asker's ability to solve a problem;
a storage unit that controls storing knowledge information of answerer candidates; and
an extraction unit that extracts an answerer who is to answer the question by conducting matching using a computed degree and the knowledge information,
wherein the extraction unit further extracts the answerer and thereby interfaces a terminal device of the asker to a terminal device of the answerer based on the extraction unit determining a match between attributes of the answerer and a degree indicated by the reference history of the asker, the degree indicating a history of the asker solving questions presented by the asker without using an extracted answerer to solve the questions, and
wherein the one or more processors are further configured to implement extracting the answerer by, in response to determining that a plurality of values exist in an unanswered question table comprising a plurality of cells:
determining an urgency of each of the cells of the unanswered question table; and
looping the following in an order of the urgency of each of the cells:
checking whether one of the cells contains a pointer to an unanswered list;
in response to determining that the one of the cells contains the pointer, looping the following from the unanswered list:
dividing a plurality of second questions and the question by word structures by calculating distances from the question to past second questions by comparing vectors of keywords between the question and the second questions;
storing answerers, including the answerer, of ones of the second questions, corresponding to ones of the distances greater than a predetermined threshold;
calculating an asker level value by a first predetermined formula;
calculating a plurality of answerer level values, respective to ones of the answerers, by a second predetermined formula;

sorting the answerers by vector distances between the asker level value and the ones of the answerer level values;

extracting the answerer in response to determining that a smallest of the vector distances is respective to the answerer.

18. An answerer extraction system comprising:
one or more processors configured to implement:
  a receiving unit that receives a question from an asker;
  a recording unit that records a reference history of the asker's referencing past questions or answers;
  a computing unit that computes, from the reference history of the asker, a degree that indicates how much the asker has researched before the question is received;
  a storage unit that controls storing knowledge information of answerer candidates; and
  an extraction unit that extracts an answerer who is to answer the question by conducting matching using the computed degree and the knowledge information,
wherein the extraction unit further extracts the answerer and thereby interfaces a terminal device of the asker to a terminal device of the answerer based on the extraction unit determining a match between attributes of the answerer and the degree indicated by the reference history of the asker, the degree indicating a history of the asker solving questions presented by the asker without using an extracted answerer to solve the questions, and
wherein the one or more processors are further configured to implement extracting the answerer by, in response to determining that a plurality of values exist in an unanswered question table comprising a plurality of cells:
  determining an urgency of each of the cells of the unanswered question table; and
  looping the following in an order of the urgency of each of the cells:
    checking whether one of the cells contains a pointer to an unanswered list;
    in response to determining that the one of the cells contains the pointer, looping the following from the unanswered list:
      dividing a plurality of second questions and the question by word structures by calculating distances from the question to past second questions by comparing vectors of keywords between the question and the second questions;
      storing answerers, including the answerer, of ones of the second questions, corresponding to ones of the distances greater than a predetermined threshold;
      calculating an asker level value by a first predetermined formula;
      calculating a plurality of answerer level values, respective to ones of the answerers, by a second predetermined formula;
      sorting the answerers by vector distances between the asker level value and the ones of the answerer level values;
      extracting the answerer in response to determining that a smallest of the vector distances is respective to the answerer.

19. An answerer extraction method comprising:
receiving a question from an asker;
recording a reference history of the asker's referencing past questions or answers; and
extracting an answerer who is to answer the question on a basis of the reference history of the asker,
wherein a terminal device of the asker is interfaced to a terminal device of the answerer based on extracting the answerer which comprises determining a match between attributes of the answerer and a degree indicated by the reference history of the asker, the degree indicating a history of the asker solving questions presented by the asker without using an extracted answerer to solve the questions, and
wherein extracting the answerer comprises, in response to determining that a plurality of values exist in an unanswered question table comprising a plurality of cells:
  determining an urgency of each of the cells of the unanswered question table; and
  looping the following in an order of the urgency of each of the cells:
    checking whether one of the cells contains a pointer to an unanswered list;
    in response to determining that the one of the cells contains the pointer, looping the following from the unanswered list:
      dividing a plurality of second questions and the question by word structures by calculating distances from the question to past second questions by comparing vectors of keywords between the question and the second questions;
      storing answerers, including the answerer, of ones of the second questions, corresponding to ones of the distances greater than a predetermined threshold;
      calculating an asker level value by a first predetermined formula;
      calculating a plurality of answerer level values, respective to ones of the answerers, by a second predetermined formula;
      sorting the answerers by vector distances between the asker level value and the ones of the answerer level values;
      extracting the answerer in response to determining that a smallest of the vector distances is respective to the answerer.

20. A non-transitory computer readable medium storing a program causing a computer to execute a process, the process comprising:
receiving a question from an asker;
recording a reference history of the asker's referencing past questions or answers; and
extracting an answerer who is to answer the question on a basis of the reference history of the asker,
wherein a terminal device of the asker is interfaced to a terminal device of the answerer based on extracting the answerer which comprises determining a match between attributes of the answerer and a degree indicated by the reference history of the asker, the degree indicating a history of the asker solving questions presented by the asker without using an extracted answerer to solve the questions, and
wherein extracting the answerer comprises, in response to determining that a plurality of values exist in an unanswered question table comprising a plurality of cells:
  determining an urgency of each of the cells of the unanswered question table; and
  looping the following in an order of the urgency of each of the cells:
    checking whether one of the cells contains a pointer to an unanswered list;

in response to determining that the one of the cells contains the pointer, looping the following from the unanswered list:

dividing a plurality of second questions and the question by word structures by calculating distances from the question to past second questions by comparing vectors of keywords between the question and the second questions;

storing answerers, including the answerer, of ones of the second questions, corresponding to ones of the distances greater than a predetermined threshold;

calculating an asker level value by a first predetermined formula;

calculating a plurality of answerer level values, respective to ones of the answerers, by a second predetermined formula;

sorting the answerers by vector distances between the asker level value and the ones of the answerer level values;

extracting the answerer in response to determining that a smallest of the vector distances is respective to the answerer.

\* \* \* \* \*